(12) United States Patent
Venett et al.

(10) Patent No.: US 9,267,007 B2
(45) Date of Patent: *Feb. 23, 2016

(54) METHOD FOR ADDITION OF ADDITIVES INTO A POLYMER MELT

(75) Inventors: Kenrick Lyle Venett, Blountville, TN (US); Bruce Roger DeBruin, Lexington, SC (US)

(73) Assignee: GRUPO PETROTEMEX, S.A. DE C.V., San Pedro Garza Garcia (MX)

( * ) Notice: Subject to any disclaimer, the term of this patent is extended or adjusted under 35 U.S.C. 154(b) by 912 days.

This patent is subject to a terminal disclaimer.

(21) Appl. No.: 11/500,862

(22) Filed: Aug. 8, 2006

(65) Prior Publication Data

US 2007/0066720 A1    Mar. 22, 2007

Related U.S. Application Data

(60) Provisional application No. 60/717,985, filed on Sep. 16, 2005.

(51) Int. Cl.
  *C08J 3/20* (2006.01)
  *C08J 3/205* (2006.01)
(52) U.S. Cl.
  CPC ............... *C08J 3/201* (2013.01); *C08J 3/2056* (2013.01)
(58) Field of Classification Search
  CPC ............................. C08G 64/307; C08J 3/201
  USPC ........................................... 528/196; 523/500
  See application file for complete search history.

(56) References Cited

U.S. PATENT DOCUMENTS

| | | | |
|---|---|---|---|
| 2,720,506 A | 10/1955 | Caldwell et al. | |
| 2,808,390 A | 10/1957 | Caldwell et al. | |
| 2,965,613 A | 12/1960 | Milone et al. | |
| 2,991,273 A | 4/1961 | Hechelhammer et al. | |
| 2,999,835 A | 9/1961 | Goldberg | |
| 2,999,846 A | 9/1961 | Schnell et al. | |

(Continued)

FOREIGN PATENT DOCUMENTS

| | | |
|---|---|---|
| AT | 259232 | 4/1965 |
| CN | 1392174 | 1/2003 |

(Continued)

OTHER PUBLICATIONS

*Plastic Additives Handbook*, 5th Ed., 2001, pp. 123-136, Hanser Gardner Publications.

(Continued)

*Primary Examiner* — Megan McCulley
(74) *Attorney, Agent, or Firm* — Oblon, McClelland, Maier & Neustadt, L.L.P.

(57) ABSTRACT

A method for adding an additive into a polymer melt, preferably a polyester polymer melt such as polyethylene terephthalate (PET), comprising:
  a. discharging a polymer melt from a reactor to form a discharged polymer melt stream, and
  b. solidifying said discharged polymer melt stream, and
  c. prior to solidification, feeding a portion of the discharged polymer melt stream to a slipstream to form a slipstream polymer melt, and
  d. feeding an additive into said slipstream polymer melt to form an additive containing slipstream, and
  e. feeding the additive containing slipstream to a location upstream from the feed location forming said slipstream.

40 Claims, 2 Drawing Sheets

(56) References Cited

U.S. PATENT DOCUMENTS

| | | |
|---|---|---|
| 3,028,365 A | 4/1962 | Schnell et al. |
| 3,148,172 A | 9/1964 | Fox |
| 3,153,008 A | 10/1964 | Fox |
| 3,264,255 A | 8/1966 | Taylor |
| 3,271,367 A | 9/1966 | Schnell et al. |
| 3,420,913 A | 1/1969 | Railsback |
| 3,451,971 A | 6/1969 | Lazarus |
| 3,533,973 A | 10/1970 | Stewart et al. |
| 3,538,045 A | 11/1970 | Stewart et al. |
| 3,624,040 A | 11/1971 | Rath et al. |
| 3,631,153 A | 12/1971 | Carter et al. |
| 3,693,960 A | 9/1972 | Golde et al. |
| 3,733,309 A | 5/1973 | Wyeth et al. |
| 3,867,349 A | 2/1975 | Heeg et al. |
| 3,869,304 A | 3/1975 | Bogulslawski et al. |
| 3,880,582 A | 4/1975 | Sawaya |
| 3,892,798 A | 7/1975 | Heeg et al. |
| 4,087,482 A | 5/1978 | Shaffer |
| 4,093,593 A | 6/1978 | Go |
| 4,100,142 A | 7/1978 | Schaefer et al. |
| 4,107,149 A | 8/1978 | Bier et al. |
| 4,123,436 A | 10/1978 | Holub et al. |
| 4,124,566 A | 11/1978 | Saiki et al. |
| 4,159,301 A | 6/1979 | Buser et al. |
| 4,161,571 A | 7/1979 | Yasui et al. |
| 4,169,006 A | 9/1979 | Matsubara et al. |
| 4,185,043 A | 1/1980 | Shaffer |
| 4,228,549 A | 10/1980 | Rispoli |
| 4,230,595 A | 10/1980 | Yamaji et al. |
| 4,250,078 A | 2/1981 | McFarlane et al. |
| 4,260,735 A | 4/1981 | Bander et al. |
| 4,289,871 A | 9/1981 | Rowan et al. |
| 4,330,661 A | 5/1982 | Go |
| 4,343,922 A | 8/1982 | Shaffer |
| 4,357,461 A | 11/1982 | Go et al. |
| 4,401,804 A | 8/1983 | Wooten et al. |
| 4,408,004 A | 10/1983 | Pengilly |
| 4,420,581 A | 12/1983 | McFarlane et al. |
| 4,424,337 A | 1/1984 | Smith et al. |
| 4,433,135 A | 2/1984 | Worley et al. |
| 4,434,276 A | 2/1984 | Horlbeck et al. |
| 4,440,924 A | 4/1984 | Kuze et al. |
| 4,447,595 A | 5/1984 | Smith et al. |
| 4,476,272 A | 10/1984 | Pengilly |
| 4,481,314 A | 11/1984 | Rule |
| 4,501,878 A | 2/1985 | Adams |
| 4,520,078 A | 5/1985 | Rabinowitz et al. |
| 4,535,118 A | 8/1985 | Pengilly |
| 4,551,368 A | 11/1985 | Smith et al. |
| 4,604,303 A | 8/1986 | Takakura et al. |
| 4,613,664 A | 9/1986 | Tate et al. |
| 4,617,374 A | 10/1986 | Pruett et al. |
| 4,619,987 A | 10/1986 | Saiki et al. |
| 4,647,650 A | 3/1987 | Sasaki et al. |
| 4,686,274 A | 8/1987 | Harris et al. |
| 4,702,963 A | 10/1987 | Phillips et al. |
| 4,704,417 A | 11/1987 | Bonin et al. |
| 4,705,844 A | 11/1987 | Espenschied et al. |
| 4,740,377 A | 4/1988 | Dawes et al. |
| 4,764,323 A | 8/1988 | Al Ghatta |
| 4,775,598 A | 10/1988 | Jaeckel |
| 4,806,696 A | 2/1989 | Job |
| 4,831,115 A | 5/1989 | Golba, Jr. et al. |
| 4,845,186 A | 7/1989 | Chujo et al. |
| 4,876,230 A | 10/1989 | Job |
| 4,906,693 A | 3/1990 | Craun et al. |
| 4,982,014 A | 1/1991 | Freitag et al. |
| 5,008,230 A | 4/1991 | Nichols |
| 5,010,162 A | 4/1991 | Serini et al. |
| 5,041,405 A | 8/1991 | Lunsford et al. |
| 5,049,647 A | 9/1991 | Al-Ghatta |
| 5,090,134 A | 2/1992 | Russemeyer et al. |
| 5,104,965 A | 4/1992 | Jenkins et al. |
| 5,114,570 A | 5/1992 | Nelson et al. |
| 5,124,301 A | 6/1992 | Wyness et al. |
| 5,220,140 A | 6/1993 | Ball et al. |
| 5,250,333 A | 10/1993 | McNeely et al. |
| 5,254,288 A | 10/1993 | Verheijen et al. |
| 5,258,233 A | 11/1993 | Mills et al. |
| 5,266,413 A | 11/1993 | Mills et al. |
| 5,296,587 A | 3/1994 | Sumner, Jr. et al. |
| 5,300,746 A | 4/1994 | Walters et al. |
| 5,310,977 A | 5/1994 | Stenkamp et al. |
| 5,317,066 A | 5/1994 | Watanabe et al. |
| 5,318,797 A | 6/1994 | Matijevic et al. |
| 5,322,883 A | 6/1994 | Adyha et al. |
| 5,331,066 A | 7/1994 | Takanoo et al. |
| 5,340,884 A | 8/1994 | Mills et al. |
| 5,367,070 A | 11/1994 | Nath et al. |
| 5,372,864 A | 12/1994 | Weaver et al. |
| 5,376,702 A | 12/1994 | Stibal et al. |
| 5,382,157 A | 1/1995 | Denis et al. |
| 5,384,337 A | 1/1995 | Budinger |
| 5,384,377 A | 1/1995 | Weaver et al. |
| 5,393,871 A | 2/1995 | Yau et al. |
| 5,403,807 A | 4/1995 | Narula |
| 5,409,983 A | 4/1995 | Jones et al. |
| 5,410,984 A | 5/1995 | Pikus et al. |
| 5,419,936 A | 5/1995 | Tindale |
| 5,466,803 A | 11/1995 | Borzatta et al. |
| 5,496,887 A | 3/1996 | Braune |
| 5,514,462 A | 5/1996 | Endo et al. |
| 5,519,112 A | 5/1996 | Harazoe et al. |
| 5,529,744 A | 6/1996 | Tindale |
| 5,573,820 A | 11/1996 | Harazoe et al. |
| 5,589,530 A | 12/1996 | Walsh |
| 5,593,740 A | 1/1997 | Strumban et al. |
| 5,608,027 A | 3/1997 | Crosby et al. |
| 5,610,231 A | 3/1997 | Braune |
| 5,646,208 A | 7/1997 | Cattron et al. |
| 5,648,032 A | 7/1997 | Nelson et al. |
| 5,656,221 A | 8/1997 | Schumann et al. |
| 5,656,716 A | 8/1997 | Schmidt et al. |
| 5,674,801 A | 10/1997 | George |
| 5,688,874 A | 11/1997 | Hoffman |
| 5,718,860 A | 2/1998 | Lee et al. |
| 5,774,571 A | 6/1998 | Marshall |
| 5,830,544 A | 11/1998 | Kerscher et al. |
| 5,830,981 A | 11/1998 | Koreishi et al. |
| 5,837,786 A | 11/1998 | Miyoshi et al. |
| 5,851,668 A | 12/1998 | Sandor et al. |
| 5,874,515 A * | 2/1999 | Huang et al. ............ 528/176 |
| 5,886,133 A | 3/1999 | Hilbert et al. |
| 5,898,058 A * | 4/1999 | Nichols et al. ............ 528/286 |
| 5,906,882 A | 5/1999 | Valente et al. |
| 5,925,710 A | 7/1999 | Wu et al. |
| 5,940,022 A | 8/1999 | Takatsu |
| 5,945,460 A | 8/1999 | Ekart et al. |
| 5,962,608 A | 10/1999 | Ryang et al. |
| 5,976,450 A | 11/1999 | Mreijen |
| 5,998,004 A | 12/1999 | Nishino et al. |
| 6,020,419 A | 2/2000 | Bock et al. |
| 6,020,421 A | 2/2000 | Fukushima et al. |
| 6,022,920 A | 2/2000 | Maxwell et al. |
| 6,031,128 A | 2/2000 | Roh et al. |
| 6,034,202 A | 3/2000 | Aharoni et al. |
| 6,036,905 A | 3/2000 | Park et al. |
| 6,042,773 A | 3/2000 | Teramoto et al. |
| 6,063,827 A | 5/2000 | Sacripante et al. |
| 6,066,714 A | 5/2000 | Putzig et al. |
| 6,099,778 A | 8/2000 | Nelson et al. |
| 6,150,454 A | 11/2000 | Wu et al. |
| 6,156,867 A | 12/2000 | Aoyama et al. |
| 6,165,601 A | 12/2000 | Noda et al. |
| 6,166,170 A | 12/2000 | Putzig |
| 6,197,851 B1 | 3/2001 | Maxwell et al. |
| 6,200,659 B1 | 3/2001 | Fujimori et al. |
| 6,214,915 B1 | 4/2001 | Avakian et al. |
| 6,261,656 B1 | 7/2001 | Semersky |
| 6,274,212 B1 | 8/2001 | Rule et al. |
| 6,274,852 B1 | 8/2001 | Blok et al. |
| 6,281,278 B1 | 8/2001 | Takase et al. |
| 6,300,399 B1 | 10/2001 | Gallucci et al. |
| 6,313,200 B1 | 11/2001 | Finder |

(56) References Cited

U.S. PATENT DOCUMENTS

| | | | |
|---|---|---|---|
| 6,316,584 B1 | 11/2001 | Seidel et al. | |
| 6,323,271 B1 | 11/2001 | Caldwell et al. | |
| 6,346,070 B1 | 2/2002 | Ohmatsuza et al. | |
| 6,358,578 B1 | 3/2002 | Otto et al. | |
| 6,365,659 B1 | 4/2002 | Aoyama et al. | |
| 6,384,180 B1 | 5/2002 | Jernigan et al. | |
| 6,417,320 B1 | 7/2002 | Otto et al. | |
| 6,427,826 B1 | 8/2002 | Li et al. | |
| 6,428,882 B1 | 8/2002 | Peiffer et al. | |
| 6,441,129 B2* | 8/2002 | Duh et al. | 528/503 |
| 6,451,959 B1 | 9/2002 | Ohmatsuzawa et al. | |
| 6,465,098 B2 | 10/2002 | Mizuguchi et al. | |
| 6,472,471 B2 | 10/2002 | Cooke et al. | |
| 6,472,500 B2 | 10/2002 | Dhawan et al. | |
| 6,473,024 B2 | 10/2002 | Toyoda et al. | |
| 6,489,434 B2 | 12/2002 | Jen | |
| 6,498,212 B1 | 12/2002 | Kao et al. | |
| 6,500,890 B2 | 12/2002 | Edwards et al. | |
| 6,500,915 B1 | 12/2002 | Fujimori et al. | |
| 6,503,586 B1 | 1/2003 | Wu et al. | |
| 6,541,598 B2 | 4/2003 | Duan et al. | |
| 6,559,271 B2* | 5/2003 | Schaaf et al. | 528/272 |
| 6,569,479 B2 | 5/2003 | Rule | |
| 6,569,991 B2 | 5/2003 | Nichols et al. | |
| 6,572,810 B2 | 6/2003 | Chatterjee et al. | |
| 6,573,359 B2 | 6/2003 | Nichols et al. | |
| 6,590,069 B2* | 7/2003 | Nichols et al. | 528/491 |
| 6,599,596 B2 | 7/2003 | Nichols et al. | |
| 6,601,987 B2* | 8/2003 | Finder et al. | 366/272 |
| 6,638,456 B2 | 10/2003 | Klein et al. | |
| 6,649,731 B2 | 11/2003 | Hori et al. | |
| 6,660,792 B2 | 12/2003 | Massey et al. | |
| 6,664,413 B1* | 12/2003 | Cockrem | 560/204 |
| 6,710,158 B2 | 3/2004 | Edwards et al. | |
| 6,716,904 B2 | 4/2004 | Takahashi | |
| 6,727,306 B2 | 4/2004 | Edwards et al. | |
| 6,733,873 B2 | 5/2004 | Mizutani et al. | |
| 6,773,800 B2 | 8/2004 | Hosoe et al. | |
| 6,774,204 B1 | 8/2004 | Putzig | |
| 6,777,048 B2 | 8/2004 | Quillen | |
| 6,780,916 B2 | 8/2004 | Tung et al. | |
| 6,787,630 B1 | 9/2004 | Dominguez De Walter et al. | |
| 6,797,401 B2 | 9/2004 | Herron | |
| 6,803,082 B2 | 10/2004 | Nichols et al. | |
| 6,827,897 B2 | 12/2004 | Hall et al. | |
| 6,828,272 B2 | 12/2004 | Wiegner et al. | |
| 6,852,388 B2 | 2/2005 | Murschall et al. | |
| 6,887,947 B1 | 5/2005 | Schaefer et al. | |
| 6,896,830 B2 | 5/2005 | Carlton et al. | |
| 6,896,966 B2 | 5/2005 | Crawford et al. | |
| 6,906,164 B2* | 6/2005 | DeBruin | 528/308.1 |
| 6,908,956 B2 | 6/2005 | Sutoris et al. | |
| 6,953,768 B2 | 10/2005 | Wallace et al. | |
| 7,138,478 B2* | 11/2006 | Kohlgruber et al. | 528/196 |
| 7,300,967 B2 | 11/2007 | Xia | |
| 7,358,322 B2* | 4/2008 | Jernigan et al. | 528/271 |
| 7,368,522 B2* | 5/2008 | Jernigan et al. | 528/271 |
| 7,459,113 B2* | 12/2008 | Colhoun et al. | 264/176.1 |
| 7,786,247 B2* | 8/2010 | Jernigan et al. | 528/272 |
| 2002/0011694 A1 | 1/2002 | Nichols et al. | |
| 2002/0014718 A1 | 2/2002 | Klein et al. | |
| 2002/0032300 A1 | 3/2002 | Dowling et al. | |
| 2002/0077443 A1 | 6/2002 | Nichols et al. | |
| 2002/0086969 A1* | 7/2002 | DeBruin | B01D 19/0042 528/272 |
| 2002/0087027 A1 | 7/2002 | Lindall et al. | |
| 2002/0091226 A1 | 7/2002 | Nichols et al. | |
| 2002/0094402 A1 | 7/2002 | Jen | |
| 2002/0128427 A1 | 9/2002 | Schaaf et al. | |
| 2002/0136808 A1 | 9/2002 | Rule | |
| 2002/0137872 A1 | 9/2002 | Schneider et al. | |
| 2002/0137879 A1 | 9/2002 | Ohmatsuzawa et al. | |
| 2002/0156229 A1 | 10/2002 | Silva et al. | |
| 2002/0193555 A1 | 12/2002 | Hori et al. | |
| 2002/0198297 A1 | 12/2002 | Odorisio et al. | |
| 2003/0018160 A1 | 1/2003 | Otto et al. | |
| 2003/0040564 A1 | 2/2003 | Tung et al. | |
| 2003/0045673 A1 | 3/2003 | Nakajima et al. | |
| 2003/0083191 A1 | 5/2003 | Nakajima et al. | |
| 2003/0108702 A1 | 6/2003 | Tung et al. | |
| 2003/0144459 A1 | 7/2003 | Fujimori et al. | |
| 2003/0216253 A1 | 11/2003 | Wiegner et al. | |
| 2004/0023000 A1 | 2/2004 | Young et al. | |
| 2004/0058805 A1 | 3/2004 | Nakajima et al. | |
| 2004/0077486 A1 | 4/2004 | Bellamy et al. | |
| 2004/0086733 A1 | 5/2004 | Fujimori et al. | |
| 2004/0096609 A1 | 5/2004 | Nichols et al. | |
| 2004/0101642 A1 | 5/2004 | Quillen et al. | |
| 2004/0102316 A1 | 5/2004 | Wallace et al. | |
| 2004/0106767 A1 | 6/2004 | Simon et al. | |
| 2004/0127653 A1 | 7/2004 | Ellington et al. | |
| 2004/0138057 A1 | 7/2004 | Wenzel | |
| 2004/0178386 A1 | 9/2004 | Tung et al. | |
| 2004/0180159 A1 | 9/2004 | Neal et al. | |
| 2004/0180996 A1 | 9/2004 | Pearson et al. | |
| 2004/0180997 A1 | 9/2004 | Pearson et al. | |
| 2004/0185198 A1 | 9/2004 | Sisson et al. | |
| 2004/0192813 A1 | 9/2004 | Pearson et al. | |
| 2004/0224842 A1 | 11/2004 | Wallace et al. | |
| 2004/0225103 A1* | 11/2004 | Kohlgrueber et al. | 528/196 |
| 2004/0225104 A1 | 11/2004 | Wiegner et al. | |
| 2004/0230025 A1 | 11/2004 | DeBruin | |
| 2004/0236066 A1 | 11/2004 | Moore et al. | |
| 2004/0241468 A1 | 12/2004 | Otaki | |
| 2004/0249113 A1 | 12/2004 | Quillen et al. | |
| 2005/0009941 A1 | 1/2005 | Sicken et al. | |
| 2005/0107576 A1 | 5/2005 | Hori et al. | |
| 2005/0153086 A1 | 7/2005 | Moore et al. | |
| 2005/0187306 A1 | 8/2005 | Kulkarni | |
| 2005/0203267 A1 | 9/2005 | Jernigan et al. | |
| 2005/0222345 A1 | 10/2005 | Nakayama et al. | |
| 2005/0277759 A1* | 12/2005 | Pearson | C08G 63/46 528/272 |
| 2006/0047103 A1 | 3/2006 | Armentrout | |
| 2006/0223958 A1 | 10/2006 | Fischbuch | |
| 2007/0066735 A1 | 3/2007 | Quillen et al. | |
| 2007/0203279 A1 | 8/2007 | Jarvis et al. | |

FOREIGN PATENT DOCUMENTS

| | | |
|---|---|---|
| CN | 1482154 | 3/2004 |
| DE | 1950553 | 4/1970 |
| DE | 19841376 | 3/2000 |
| EP | 0578464 | 1/1994 |
| EP | 0581246 | 2/1994 |
| EP | 699700 | 3/1996 |
| EP | 0541702 | 9/1996 |
| EP | 0465040 | 1/1997 |
| EP | 0884365 | 12/1998 |
| EP | 0921144 | 6/1999 |
| EP | 1065230 | 1/2001 |
| EP | 1152035 | 11/2001 |
| EP | 1477506 | 11/2004 |
| EP | 1227117 | 12/2004 |
| EP | 1516892 | 3/2005 |
| EP | 1535944 | 6/2005 |
| EP | 1548046 | 6/2005 |
| EP | 1239006 | 7/2005 |
| GB | 673066 | 6/1952 |
| GB | 1 277 264 | 6/1972 |
| GB | 1337751 | 11/1973 |
| JP | 46-35500 | 10/1971 |
| JP | 46040711 | 12/1971 |
| JP | 46040713 | 12/1971 |
| JP | 46040714 | 12/1971 |
| JP | 46041025 | 12/1971 |
| JP | 46041033 | 12/1971 |
| JP | 47039497 | 11/1972 |
| JP | 4704289 | 12/1972 |
| JP | 48005798 | 1/1973 |
| JP | 48007272 | 3/1973 |
| JP | 48026955 | 4/1973 |
| JP | 48056782 | 8/1973 |
| JP | 48056783 | 8/1973 |

(56) References Cited

FOREIGN PATENT DOCUMENTS

| | | |
|---|---|---|
| JP | 48056784 | 8/1973 |
| JP | 48-79896 | 10/1973 |
| JP | 4879896 | 10/1973 |
| JP | 48031991 | 10/1973 |
| JP | 48079898 | 10/1973 |
| JP | 73035948 | 10/1973 |
| JP | 48036634 | 11/1973 |
| JP | 48038635 | 11/1973 |
| JP | 48038637 | 11/1973 |
| JP | 48044959 | 12/1973 |
| JP | 48099133 | 12/1973 |
| JP | 48102191 | 12/1973 |
| JP | 49005918 | 1/1974 |
| JP | 49010834 | 1/1974 |
| JP | 49006835 | 2/1974 |
| JP | 49006839 | 2/1974 |
| JP | 49009116 | 3/1974 |
| JP | 49045014 | 4/1974 |
| JP | 49045015 | 4/1974 |
| JP | 50-5735 B | 3/1975 |
| JP | 50-10196 B2 | 4/1975 |
| JP | 50039711 | 4/1975 |
| JP | 51042795 | 4/1976 |
| JP | 51127195 | 11/1976 |
| JP | 51145594 | 12/1976 |
| JP | 52-039790 | 3/1977 |
| JP | 52123489 | 10/1977 |
| JP | 52129798 | 10/1977 |
| JP | 52129799 | 10/1977 |
| JP | 53051294 | 5/1978 |
| JP | 53051295 | 5/1978 |
| JP | 53052595 | 5/1978 |
| JP | 53105591 | 9/1978 |
| JP | 54135896 | 10/1979 |
| JP | 54163996 | 12/1979 |
| JP | 55089332 | 7/1980 |
| JP | 55115425 | 9/1980 |
| JP | 55149320 | 11/1980 |
| JP | 56008431 | 1/1981 |
| JP | 56-149423 | 11/1981 |
| JP | 57038609 | 6/1982 |
| JP | 58109532 | 6/1983 |
| JP | 59-015427 | 1/1984 |
| JP | 60139750 | 7/1985 |
| JP | 60-151826 | 8/1985 |
| JP | 60202148 | 10/1985 |
| JP | 60219226 | 11/1985 |
| JP | 61-278558 | 12/1986 |
| JP | 61-291650 | 12/1986 |
| JP | 62-039208 | 2/1987 |
| JP | 62152715 | 7/1987 |
| JP | 62161827 | 7/1987 |
| JP | 62-177035 | 8/1987 |
| JP | 62207337 | 9/1987 |
| JP | 62297318 | 12/1987 |
| JP | 63-264661 | 11/1988 |
| JP | 63-315604 | 12/1988 |
| JP | 62-182065 | 1/1989 |
| JP | 22-14734 | 8/1990 |
| JP | 3146707 | 6/1991 |
| JP | 3161509 | 7/1991 |
| JP | 3292323 | 12/1991 |
| JP | 4370142 | 12/1992 |
| JP | 5097990 | 4/1993 |
| JP | 5-117379 | 5/1993 |
| JP | 5-287067 | 11/1993 |
| JP | 60-31526 | 2/1994 |
| JP | 6087953 | 3/1994 |
| JP | 06-184333 | 7/1994 |
| JP | 62-71949 | 9/1994 |
| JP | 1994271494 | 9/1994 |
| JP | 62-79599 | 10/1994 |
| JP | 6286088 | 10/1994 |
| JP | 1994306154 | 11/1994 |
| JP | 7133412 | 5/1995 |
| JP | 7224218 | 8/1995 |
| JP | 72-68188 | 10/1995 |
| JP | 1995268188 | 10/1995 |
| JP | 1996003301 | 1/1996 |
| JP | 1996283398 | 10/1996 |
| JP | 8325364 | 12/1996 |
| JP | 1997040850 | 2/1997 |
| JP | 9176464 | 7/1997 |
| JP | 9176465 | 7/1997 |
| JP | 9183892 | 7/1997 |
| JP | 09-256220 | 9/1997 |
| JP | 9272793 | 10/1997 |
| JP | 10316765 | 12/1998 |
| JP | 11005892 | 1/1999 |
| JP | 1999071106 | 3/1999 |
| JP | 1999152324 | 6/1999 |
| JP | 11-181067 | 7/1999 |
| JP | 1999236440 | 8/1999 |
| JP | 2000128970 | 5/2000 |
| JP | 2000128971 | 5/2000 |
| JP | 2000129102 | 5/2000 |
| JP | 2000226446 | 8/2000 |
| JP | 2000302854 | 10/2000 |
| JP | 200126639 | 1/2001 |
| JP | 2001163964 | 6/2001 |
| JP | 2001262016 | 9/2001 |
| JP | 2002249648 | 9/2002 |
| JP | 2002249653 | 9/2002 |
| JP | 2002322254 | 11/2002 |
| JP | 2002322258 | 11/2002 |
| JP | 2002332337 | 11/2002 |
| JP | 2003040992 | 2/2003 |
| JP | 2003113230 | 4/2003 |
| JP | 2003113232 | 4/2003 |
| JP | 2003171454 | 6/2003 |
| JP | 2003171455 | 6/2003 |
| JP | 2003-268628 | 9/2003 |
| JP | 2003268093 | 9/2003 |
| JP | 2003301038 | 10/2003 |
| JP | 2003301090 | 10/2003 |
| JP | 2003301093 | 10/2003 |
| JP | 2003306536 | 10/2003 |
| JP | 2003306538 | 10/2003 |
| JP | 2003306541 | 10/2003 |
| JP | 2003306601 | 10/2003 |
| JP | 2004035659 | 2/2004 |
| JP | 2004035660 | 2/2004 |
| JP | 2004067733 | 3/2004 |
| JP | 2004149790 | 5/2004 |
| JP | 2004156055 | 6/2004 |
| JP | 2004197088 | 7/2004 |
| JP | 2004204138 | 7/2004 |
| JP | 2004224858 | 8/2004 |
| JP | 2004256633 | 9/2004 |
| JP | 2004323627 | 11/2004 |
| JP | 2005023160 | 1/2005 |
| JP | 2005047960 | 2/2005 |
| JP | 2005047961 | 2/2005 |
| JP | 2005047962 | 2/2005 |
| JP | 2005187556 | 7/2005 |
| JP | 2005187557 | 7/2005 |
| JP | 2005187558 | 7/2005 |
| JP | 2005187559 | 7/2005 |
| JP | 2005187560 | 7/2005 |
| JP | 2005187561 | 7/2005 |
| JP | 2005220234 | 8/2005 |
| JP | 2005213291 | 11/2005 |
| JP | 2005213292 | 11/2005 |
| JP | 2005213293 | 11/2005 |
| KR | 19930003713 | 5/1993 |
| KR | 120831 | 7/1995 |
| KR | 1997-0007952 | 5/1997 |
| KR | 2001089942 | 10/2001 |
| NL | 7113206 | 1/1973 |
| SU | 374343 | 7/1973 |
| WO | WO 96/03163 | 2/1996 |
| WO | WO 97/44376 | 11/1997 |
| WO | WO 98/41559 | 9/1998 |
| WO | WO 99/57173 | 11/1999 |

(56) References Cited

FOREIGN PATENT DOCUMENTS

| WO | WO 01/14452 | 3/2001 |
| --- | --- | --- |
| WO | WO 01/21680 | 3/2001 |
| WO | WO 01/46306 | 6/2001 |
| WO | WO 01/47688 | 7/2001 |
| WO | WO 01/90453 | 11/2001 |
| WO | WO 02/18472 | 3/2002 |
| WO | WO 02/051616 | 7/2002 |
| WO | WO 02/068497 | 9/2002 |
| WO | WO 02/072665 | 9/2002 |
| WO | WO 03/010226 | 2/2003 |
| WO | WO 2004/065452 | 8/2004 |
| WO | WO 2004/074365 | 9/2004 |
| WO | WO 2004/078825 | 9/2004 |
| WO | WO 2004/101645 | 11/2004 |
| WO | WO 2005/068531 | 7/2005 |
| WO | WO 2005/075539 | 8/2005 |
| WO | WO 2005/082527 | 9/2005 |
| WO | WO 2005/095516 | 10/2005 |

OTHER PUBLICATIONS

Kamatani et al., Effect of Phosphoric Acid on the POlycondensation of Bis(2-hydroxyethyl) Terephthalate Catalyzed by Sb(III) Compounds; Polymer Journal, 1979, pp. 125-130; vol. 12, No. 2.
Terekhova et al., Blocking of Terminal Groups of Polyethylene Terephthalate with o-Phosphoric Acid; Sciende and Technology: Synthetic Fibers, pp. 1-5; No. 2.
Fred W. Billmeyer, Jr., Methods for Estimating Intrinsic Vicosity, *Journal of Polymer Science*, 4, 1949, pp. 83-86, E.I. du Pont de Nemours and Co., Arlington, New Jersey.
Carl W. Fuller, Colored Iron Oxide Pigments, *Synthetic Pigment Handbook*, 1973, pp. 323-349, vol. 1, John Wiley and Sons, New York.
Fred W. Billmeyer, Jr., Principles of Color Technology, *Describing Color*, 1981, pp. 25-66, John Wiley and Sons, New York.
Kirk Othmer, Titanium and Titanium Alloys, *Encyclopedia of Chemical Technology*, vol. 24, $4^{th}$ Ed., 1997, pp. 186-224; 225-349 and 801.
Louis E. Toth, Transition Metal Carbide and Nitrides, General Properties, Preparation and Characterization, 1971, p. 1-28, Academic Press, New York.
Kirk Othmer, *Encyclopedia of Chemical Technology*, vol. 17, $4^{th}$ Ed., 1996, pp. 108-127.
Kirk Othmer, *Encyclopedia of Chemical Technology*, vol. 4, $4^{th}$ Ed., 1992, pp. 841-848.
Kirk Othmer, *Encyclopedia of Chemical Technology*, vol. 4, $4^{th}$ Ed., 1997, pp. 423-430.
Kirk Othmer, *Encyclopedia of Chemical Technology*, vol. 25, $4^{th}$ Ed., 1998, pp. 872-873.
Kirk Othmer, *Encyclopedia of Chemical Technology*, vol. 23, $4^{th}$ Ed., 1997, p. 676.
Kirk Othmer, *Encyclopedia of Chemical Technology*, vol. 6, $4^{th}$ Ed., 1998, pp. 228-311.
Kirk Othmer, *Encyclopedia of Chemical Technology*, vol. 24, $4^{th}$ Ed., 1998, pp. 572-602.
Kirk Othmer, *Encyclopedia of Chemical Technology*, vol. 14., $4^{th}$ Ed., 1998, pp. 829-902.
Kirk Othmer, *Encyclopedia of Chemical Technology*, vol. 17, $4^{th}$ Ed., 1998, pp. 1-42; 43-67.
Kirk Othmer, *Encyclopedia of Chemical Technology*, vol. 12, $4^{th}$ Ed., 1998, pp. 863-881.
Kirk Othmer, *Encyclopedia of Chemical Technology*, vol. 22, $4^{th}$ Ed., 1997, pp. 256-278.
Kirk Othmer, *Encyclopedia of Chemical Technology*, vol. 16, $4^{th}$ Ed., pp. 925-962.
D.C. Allport and A.A. Mohajer, *Block Copolymers*, 1973, pp. 264-270, John Wiley and Sons, New York.
M.E. Stewart, A.J. Cox, D.M. Naylor, Reactive Processing of Poly(ethylene 2,6-naphthalene dicarboxylate)/poly(ethylene terephthalate) Blends, *Polymer*, 1993, pp. 4060-4067, vol. 34, No. 19; Butterworth-Heinemann Ltd.
Liu et al., Improving Oxygen Barrier Properties of Poly(ethylene terephthlate) by Incorporating Isophthalate. I. Effect of Orientation, *Journal of Applied Science*, Nov. 15, 2005, 98(4), pp. 1615-1628, Wiley Periodicals, Inc.
Terekhova et al., Heat Stability of Polyethylene Terephthalate (PET) Containing Phosphoric Esters, Khimicheskie Volokna, 1964, No. 4, pp. 1-6, All-Union Scientific Research Institute of Fibers.
A. Boehm and A. Glaser, The Quaterrylimides-Highly Efficient NIR Absorbers for Plastics, ANTEC paper 2004, Chicago, IL, May 2004.
Wu, S., A Generalized Criterion for Rubber Toughening: The Critical Matrix Ligament Thickness, *Journal of Applied Polymer Science*, vol. 35, pp. 549-561, 1988, John Wiley and Sons.
Weissmann, Mariana, et al.; "Theoretical Study of carbon-Coated Iron Nanowires"; *Physical Review B70*, 201401-1 through 201401-4; 2004; The American Physical Society.
Zhang, Z.D. et al.; "Shell/Core Structure and Magnetic Properties of Carbon-Coated Fe—Co© Nanocapsules"; *Journal of Physics: Condensed Matter 13*; 1921-1929; 2001; Institute of Physics Publishing Ltd.
*Encyclopedia of Chemical Technology*; $4^{th}$ Ed; vol. 4; pp. 1015-1037; John Wiley and Sons, New York.
Pierson, H.O.; *Handbook of Carbon, Graphite, Diamond and Fullerenes: Properties and Applications*; pp. 122-140; Noyes Publications; 1993.
Love, Charles H., (Retired), *Colored Iron Oxide Pigments, Natural*; pp. 323-332.
Hans Meerwein and Theodor Bersin, Investigations of Metal Alcholates and Ortho Acide Esters, Annalen der Chemie, Chemical Institute of Marburg University, 1929, pp. 113-150, vol. 454765.
Hans Meerwein, Increase in Ionization Capacity of Weak Electrolytes as a Result of Complex Formation and its Significance for Catalytic Processes, Annalen der Chemie, Chemical Institute of Konigsberg University, 1927, pp. 222-253, vol. 455.
Research Disclosure 39771; Anonymous; May 1997.
Co-pending U.S. Appl. No. 11/495,431, filed Jul. 28, 2006.
Co-pending U.S. Appl. No. 11/154,208, filed Jun. 16, 2005.
Co-pending U.S. Appl. No. 11/229,367, filed Sep. 16, 2005.
Co-pending U.S. Appl. No. 11/229,238, filed Sep. 16, 2005.
Office action dated May 14, 2007 from co-pending U.S. Appl. No. 11/229,367.
Office action dated Aug. 2, 2006 from co-pending U.S. Appl. No. 11/229,367.
Office action dated Jan. 18, 2007 from co-pending U.S. Appl. No. 11/229,367.
International Search Report from co-pending U.S. Appl. No. 11/154,208.
International Search Report from co-pending U.S. Appl. No. 11/229,367.
Fred W. Billmeyer, Jr., Methods for Estimating Intrinsic Viscosity, *Journal of Polymer Science*, 4, 1949, pp. 83-86, E.I. du Pont de Nemours and Co., Arlington, New Jersey.
International Search Report and Written Opinion of the International Searching Authority for Corresponding PCT Application PCT/US2006/034524.
International Search Report and Written Opinion of the International Searching Authority for PCT Application PCT/US2006/34551.
Co-pending U.S. Appl. No. 11/500,800, filed Aug. 8, 2006.
International Search Report from co-pending U.S. Appl. No. 11/495,431; International Appl. No. PCT/US06/34616.
International Search Report and the Written Opinion of the International Searching Authority for PCT Application PCT/US2006/34543.
International Search Report and the Written Opinion of the International Searching Authority for PCT Application PCT/US2006/34524.
Office Action dated Jul. 8, 2009, in co-pending U.S. Appl. No. 11/500,800.
Office Action dated Jan. 25, 2008, in co-pending U.S. Appl. No. 11/229,367.
Office Action dated May 15, 2008, in co-pending U.S. Appl. No. 11/229,367.
Notice of Allowance dated Nov. 7, 2008 in co-pending U.S. Appl. No. 11/229,367.

(56) References Cited

OTHER PUBLICATIONS

Notice of Allowance dated Dec. 30, 2008 in co-pending U.S. Appl. No. 11/229,367.
Office Action dated Apr. 6, 2009, in co-pending U.S. Appl. No. 11/229,367.
Office Action dated Apr. 29, 2008, in co-pending U.S. Appl. No. 11/229,238.
Office Action dated Dec. 18, 2008, in co-pending U.S. Appl. No. 11/229,238.
Office Action dated Jun. 23, 2009, in co-pending U.S. Appl. No. 11/229,238.
Office Action dated Jun. 9, 2008, in co-pending U.S. Appl. No. 11/495,431.
Office Action dated Dec. 15, 2008, in co-pending U.S. Appl. No. 11/495,431.
Office Action dated Jun. 4, 2009, in co-pending U.S. Appl. No. 11/495,431.
Office Action dated Aug. 6, 2008, in co-pending U.S. Appl. No. 11/154,208.
Office Action dated Jan. 12, 2009, in co-pending U.S. Appl. No. 11/154,208.
Office Action dated Jul. 2, 2009, in co-pending U.S. Appl. No. 11/154,208.
Office Action dated Dec. 30, 2009 in co-pending U.S. Appl. No. 11/495,431.
Office Action dated Nov. 9, 2009, in co-pending U.S. Appl. No. 11/154,208.
Office Action dated Jan. 26, 2010, in co-pending U.S. Appl. No. 11/229,238.
Notice of Allowance dated Aug. 4, 2009 in co-pending U.S. Appl. No. 11/229,367.
Notice of Allowance dated Dec. 18, 2009 in co-pending U.S. Appl. No. 11/229,367.
Co-pending U.S. Appl. No. 12/611,380, filed Nov. 3, 2009.
Office Action dated Dec. 16, 2009 in co-pending U.S. Appl. No. 12/611,380.
Office Action dated Apr. 7, 2010 in co-pending U.S. Appl. No. 12/611,380.
Notice of Allowance dated Mar. 15, 2010 in co-pending U.S. Appl. No. 11/500,800.
Notice of Allowance dated May 18, 2010 in co-pending U.S. Appl. No. 11/495,431.
Korean Notice of Preliminary Rejection issued Nov. 20, 2012 in connection with Korean Patent Application No. 2008-7006769, filed Sep. 5, 2006.
First Examination Report issued Mar. 7, 2014 in Indian Patent Application No. 1778/DELNP/2008 (submitting English translation only).

\* cited by examiner

METHOD FOR ADDITION OF ADDITIVES INTO A POLYMER MELT

This application claims priority to Provisional Application Ser. No. 60/717,985, filed on Sep. 16, 2005, entitled "Method For Addition Of Additives Into A Polymer Melt".

1. FIELD OF THE INVENTION

The invention pertains to the addition of additives into a polymer melt stream, and more particularly to the addition of additives into a polymer melt stream, such as a polyester polymer, by way of a slipstream.

2. BACKGROUND OF THE INVENTION

Polymers, and in particular, polyester polymers are frequently made containing one or more additives depending upon the desired end use of the polymer. For example, in the case of polyester polymer, it is common to incorporate one or more ultra-violet inhibitors, particles for improving the reheat of bottle preforms made from the polyester polymer, toners or pigments or colored particles, acetaldehyde scavengers or inhibitors, catalyst deactivators or stabilizers, oxygen barrier material, friction reducing aids, crystallization aids, impact modifiers, and so forth. In some cases, these additives are insoluble in the polymer and require good mixing. Additionally, some additives may be sensitive to exposure to high temperatures for extended periods of time as typically seen in a polycondensation process. In other cases, some additives may inhibit the activity of catalysts.

Thus, there is a desire to provide a method for adding the additives to a polymer melt stream in a manner which at least minimizes exposure time to high temperatures, or does not inhibit activity of catalysts, or provides for good mixing, or a combination of the foregoing.

Methods for adding additive dispersions or solutions in low molecular weight carriers such as ethylene glycol, or in higher molecular weight reactive carriers such as polyoxyalkylene polyols, into a melt phase reaction after esterification and into polycondensation are also known. These processes, however, result in adding extra glycol into an oligomer mixture or into the polymer melt, which is undesirable in some cases especially as one proceeds further toward concluding the polycondensation reaction. Adding the additive neat without a carrier is usually too difficult to meter or add in desired amount.

3. BRIEF SUMMARY OF THE INVENTION

There is now provided a method for adding an additive into a polymer melt, preferably a polyester polymer melt, comprising:
  a. discharging a polymer melt from a reactor to form a discharged polymer melt stream, and
  b. solidifying said discharged polymer melt stream, and
  c. prior to solidification, feeding a portion of the discharged polymer melt stream to a slipstream to form a slipstream polymer melt, and
  d. feeding an additive into said slipstream polymer melt to form an additive containing slipstream, and
  e. feeding the additive containing slipstream to a location upstream from the feed location forming said slipstream.

The additive is liquid or solid, and can be added neat or with minimal amounts of carrier fluids, and can be pumped into the slipstream polymer or fed through an extruder into the slipstream polymer.

4. BRIEF DESCRIPTION OF THE DRAWINGS

5. DETAILED DESCRIPTION OF THE INVENTION

Figure 1:
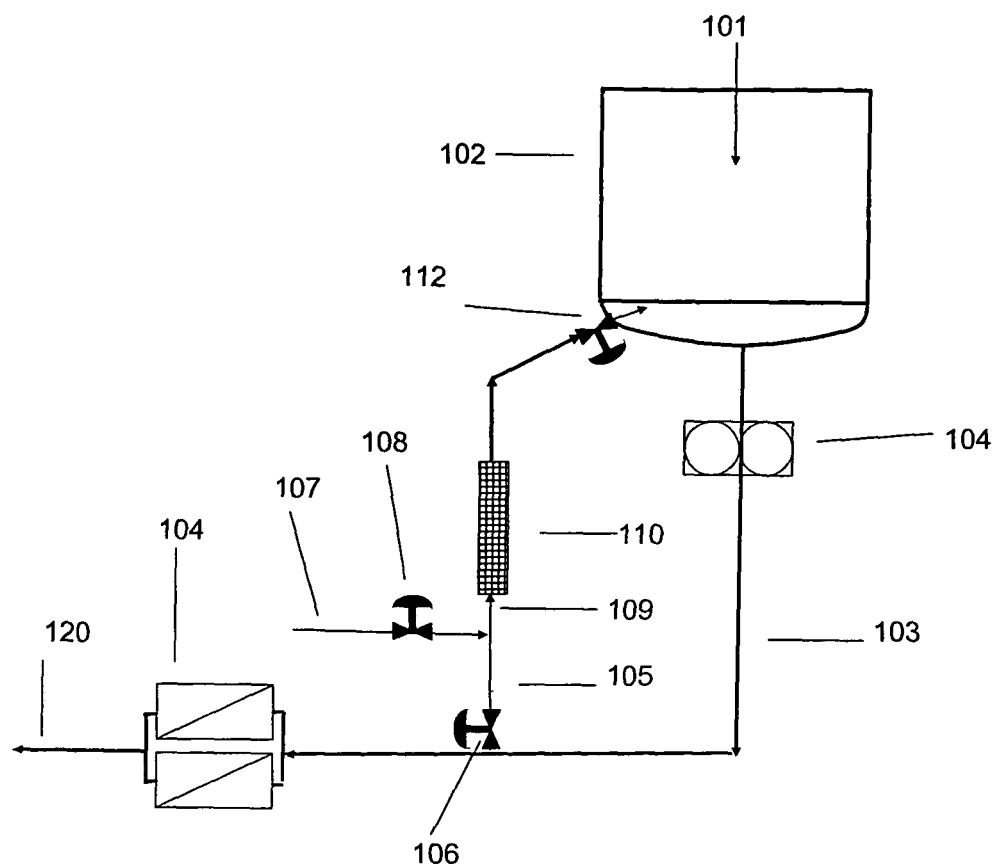
FIG. 1 is a process flow diagram illustrating a slipstream method for adding additives into a polymer melt stream.

It must also be noted that, as used in the specification and the appended claims, the singular forms "a," "an" and "the" include plural referents unless the context clearly dictates otherwise. For example, reference to processing or making a "polymer," a "preform," "article," "container," or "bottle" is intended to include the processing or making of a plurality of polymers, preforms, articles, containers or bottles. References to a composition containing "an" ingredient or "a" polymer is intended to include other ingredients or other polymers, respectively, in addition to the one named.

By "comprising" or "containing" or "having" is meant that at least the named compound, element, particle, or method step etc. must be present in the composition or article or method, but does not exclude the presence of other compounds, catalysts, materials, particles, method steps, etc., even if the other such compounds, material, particles, method steps etc. have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps is a convenient means for identifying discrete activities or steps, and unless otherwise specified, recited process steps can be arranged in any sequence.

Expressing a range includes all integers and fractions thereof within the range. Expressing a temperature or a temperature range in a process, or of a reaction mixture, or of a melt or applied to a melt, or of a polymer or applied to a polymer means in all cases that the limitation is satisfied if either the applied temperature, the actual temperature of the melt or polymer, or both are at the specified temperature or within the specified range.

The word "composition" means that each listed ingredient is present in the composition, and does not imply that any ingredient in the composition is unbound or unreacted. The composition may be solid or liquid. The stated ingredients in the composition may be bound, unbound, reacted, unreacted, and unless otherwise specified, in any oxidation state.

By a "finished" polymer composition or polymer melt stream is meant the polymer composition obtained from melt phase polycondensation of a polymer melt without any further changes to the composition. Alterations and compositional modifications may be made to the finished polymer composition after solidification from the melt phase polycondensation process.

The It.V. values described throughout this description are set forth in dL/g units as calculated from the inherent viscosity measured at 25° C. in 60% phenol and 40% 1,1,2,2-tetrachloroethane by weight. Polymer samples are dissolved in the solvent at a concentration of 0.25 g/50 mL. The viscosity of the polymer solutions is determined using a Viscotek Modified Differential Viscometer. A description of the operating principle of the differential viscometers can be found in ASTM D 5225. The inherent viscosity is calculated from the measured solution viscosity. The following equations describe such solution viscosity measurements and subsequent calculations to Ih.V. and from Ih.V. to It.V:

$$\eta_{inh}=[\ln(t_s/t_o)]/C$$

where
$\eta_{inh}$=Inherent viscosity at 25° C. at a polymer concentration of 0.5 g/100 mL of 60% phenol and 40% 1,1,2,2-tetrachloroethane by weight
ln=Natural logarithm
$t_s$=Sample flow time through a capillary tube
$t_o$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0} (\eta_{sp}/C) = \lim_{C \to 0} (\ln\eta_r)/C$$

where
$\eta_{int}$=Intrinsic viscosity
$\eta_r$=Relative viscosity=$t_s/t_o$
$\eta_{sp}$=Specific viscosity=$\eta_r-1$ Instrument calibration involves triplicate testing of a standard reference material and then applying appropriate mathematical equations to produce the "accepted" Ih.V. values. The three values used for calibration shall be within a range of 0.010; if not, correct problems and repeat testing of standard until three consecutive results within this range are obtained.

Calibration Factor=Accepted Ih.V. of Reference Material/Average of Triplicate Determinations The uncorrected inherent viscosity ($\eta_{inh}$) of each sample is calculated from the Viscotek Model Y501 Relative Viscometer using the following equation:

$$\eta_{inh}=[\ln(P_2/KP_1)]/C$$

where
$P_2$=The pressure in capillary $P_2$
$P_1$=The pressure in capillary $P_1$
ln=Natural logarithm
K=Viscosity constant obtained from baseline reading
C=Concentration of polymer in grams per 100 mL of solvent The corrected Ih.V., based on calibration with standard reference materials, is calculated as follows:

Corrected Ih.V.=Calculated Ih.V.×Calibration Factor

The intrinsic viscosity (It.V. or $\eta_{int}$) may be estimated using the Billmeyer equation as follows:

$$\eta_{int}=0.5[e^{0.5 \times Corrected\ Ih.V.}-1]+(0.75 \times Corrected\ Ih.V.)$$

The reference for estimating intrinsic viscosity (Billmeyer relationship) is J. *Polymer Sci.*, 4, pp. 83-86 (1949).

By "atoms" as used in conjunction with a transition metal is meant the transition metal atom occupying any oxidation state, any morphological state, any structural state, and any chemical state, whether as added to or as present in the polymer or composition of matter.

The polymer melt stream is any polymer which is in a liquid state and which is suitable for receiving an additive. Examples of such polymer melt streams are thermoplastic polymers, and more preferably polyester polymers, and more particularly, polyester polymers containing repeating units of terephthalate or naphthalate.

The "polyester polymer" is any thermoplastic polyester polymer. Polyester thermoplastic polymers of the invention are distinguishable from liquid crystal polymers and thermosetting polymers in that thermoplastic polymers have no appreciable ordered structure while in the liquid (melt) phase, they can be remelted and reshaped into a molded article, and liquid crystal polymers and thermosetting polymers are unsuitable for the intended applications such as packaging or stretching in a mold to make a container.

The polyester polymer contains repeating alkylene arylate units, such as alkylene terephthalate or alkylene naphthalate repeat units in the polymer chain. More specific examples of these repeating units include ethylene terephthalate, ethylene naphthalate, and trimethylene terephthalate. More preferred are polyester polymers which comprise:

(i) a carboxylic acid component comprising at least 80 mole % of the residues of terephthalic acid, derivates of terephthalic acid, naphthalene-2,6-dicarboxylic acid, derivatives of naphthalene-2,6-dicarboxylic acid, or mixtures thereof, and (ii) a hydroxyl component comprising at least 40 mole %, or at least 60 mole %, or at least 80 mole % of the residues of ethylene glycol or propane diol or cyclohexane dimethanol, preferably ethylene glycol, based on 100 mole percent of carboxylic acid component residues and 100 mole percent of hydroxyl component residues in the polyester polymer.

Typically, polyesters such as polyethylene terephthalate are made by reacting a diol such as ethylene glycol with a dicarboxylic acid as the free acid or its $C_1$-$C_4$ dialkyl ester to produce an ester monomer and/or oligomers, which are then polycondensed to produce the polyester. More than one compound containing carboxylic acid group(s) or derivative(s) thereof can be reacted during the process. All the compounds that enter the process containing carboxylic acid group(s) or derivative(s) thereof that become part of said polyester product comprise the "carboxylic acid component." The mole % of all the compounds containing carboxylic acid group(s) or derivative(s) thereof that are in the product add up to 100. The "residues" of compound(s) containing carboxylic acid group(s) or derivative(s) thereof that are in the said polyester product refers to the portion of said compound(s) which remains in the said polyester product after said compound(s) is condensed with a compound(s) containing hydroxyl group(s) and further polycondensed to form polyester polymer chains of varying length.

More than one compound containing hydroxyl group(s) or derivatives thereof can become part of the polyester polymer product(s). All the compounds that enter the process containing hydroxyl group(s) or derivatives thereof that become part of said polyester product(s) comprise the hydroxyl component. The mole % of all the compounds containing hydroxyl group(s) or derivatives thereof that become part of said polyester product(s) add up to 100. The "residues" of hydroxyl functional compound(s) or derivatives thereof that become part of said polyester product refers to the portion of said compound(s) which remains in said polyester product after said compound(s) is condensed with a compound(s) containing carboxylic acid group(s) or derivative(s) thereof and further polycondensed to form polyester polymer chains of varying length.

The mole % of the hydroxyl residues and carboxylic acid residues in the product(s) can be determined by proton NMR.

In another preferred embodiment, the polyester polymer comprises:
- (a) a carboxylic acid component comprising at least 90 mole %, or at least 92 mole %, or at least 96 mole % of the residues of terephthalic acid, derivates of terephthalic acid, naphthalene-2,6-dicarboxylic acid, derivatives of naphthalene-2,6-dicarboxylic acid, or mixtures thereof, and
- (b) a hydroxyl component comprising at least 90 mole %, or at least 92 mole %, or at least 96 mole % of the residues of ethylene glycol or propane diol, more preferably ethylene glycol, based on 100 mole percent of the carboxylic acid component residues and 100 mole percent of the hydroxyl component residues in the polyester polymer.

The reaction of the carboxylic acid component with the hydroxyl component during the preparation of the polyester polymer is not restricted to the stated mole percentages since one may utilize a large excess of the hydroxyl component if desired, e.g. on the order of up to 200 mole % relative to the 100 mole % of carboxylic acid component used. The polyester polymer made by the reaction will, however, contain the stated amounts of aromatic dicarboxylic acid residues and ethylene glycol residues.

Derivates of terephthalic acid and naphthalane dicarboxylic acid include $C_1$-$C_4$ dialkylterephthalates and $C_1$-$C_4$ dialkylnaphthalates, such as dimethylterephthalate and dimethyinaphthalate.

Modifiers can be present in amount of up to 40 mole %, or up to 20 mole %, or up to 10 mole %, or up to 8 mole %, or up to 4 mole %, based on the total moles of their respective component in the polymer. Mono, tri and higher functional modifiers are preferably present in amounts of only up to about 8 mole %, or up to 4 mole %.

In addition to a diacid component of terephthalic acid, derivates of terephthalic acid, naphthalene-2,6-dicarboxylic acid, derivatives of naphthalene-2,6-dicarboxylic acid, or mixtures thereof, the carboxylic acid component(s) of the present polyester may include one or more additional modifier carboxylic acid compounds. Such additional modifier carboxylic acid compounds include mono-carboxylic acid compounds, dicarboxylic acid compounds, and compounds with a higher number of carboxylic acid groups. Examples include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of modifier dicarboxylic acids useful as an acid component(s) are phthalic acid, isophthalic acid, naphthalene-2,6-dicarboxylic acid, cyclohexane-1,4-dicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexane-1,4-dicarboxylic acid being most preferable. It should be understood that use of the corresponding acid anhydrides, esters, and acid chlorides of these acids is included in the term "carboxylic acid". It is also possible for tricarboxyl compound branching agents and compounds with a higher number of carboxylic acid groups to modify the polyester, along with monocarboxylic acid chain terminators.

In addition to a hydroxyl component comprising ethylene glycol, the hydroxyl component of the present polyester may include additional modifier mono-ols, diols, or compounds with a higher number of hydroxyl groups. Examples of modifier hydroxyl compounds include cycloaliphatic diols preferably having 6 to 20 carbon atoms and/or aliphatic diols preferably having 3 to 20 carbon atoms. More specific examples of such diols include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane. As modifiers, the polyester polymer may preferably contain such comonomers as isophthalic acid, naphthalane dicarboxylic acid, 1,4-cyclohexanedimethanol, and diethylene glycol.

The polyester composition may include blends of polyalkylene terephthalates and/or polyalkylene naphthalates along with other thermoplastic polymers such as polycarbonate (PC) and polyamides. It is preferred that the polyester composition should comprise a majority of the polyester polymers, more preferably in an amount of at least 80 wt. %, or at least 95 wt. %, and most preferably 100 wt. %, based on the weight of all thermoplastic polymers (excluding fillers, inorganic compounds or particles, fibers, impact modifiers, or other polymers which may form a discontinuous phase). It is also preferred that the polyester polymers do not contain any fillers, fibers, or impact modifiers or other polymers which form a discontinuous phase.

In one embodiment, the composition contains post consumer recycle polyester polymer ("PCR") present in the composition which is added into the slipstream and which may be the molten polymer in a concentrate carrying the additives for incorporation into the slipstream. In this way, a convenient means is provided for both adding and blending or transesterifying PCR into virgin polyester polymer as well as adding the desired additives into the virgin polymer in one step. In one embodiment, the finished polymer composition contains at least 5 wt. % PCR, or at least 10 wt. % PCR, or at least 15 wt. % PCR. In another embodiment, scrap, waste, or reground virgin polyester polymer can be added into the slipstream such that the finished polymer composition also contains at least 0.5 wt. %, or at least 1 wt. %, or at least 5 wt. % of scrap, regrind, or waste polymer or even off-specification polymer.

The polyester polymer melt can be prepared by any esterification and polymerization procedures known in the art sufficient to effect esterification and polycondensation to produce a polyester polymer of the desired It.V. Polyester melt phase manufacturing processes include direct condensation of a dicarboxylic acid with the diol, optionally in the presence of esterification catalysts, in the esterification zone, followed by polycondensation in the prepolymer, prefinishing, and/or finishing zones in the presence of a polycondensation catalyst. Typical polycondensation catalysts include any of those known in the art, such as those based on the atoms of antimony, germanium, titanium, alkaline earth metal or alkali metals, aluminum, magnesium, manganese, zinc, cobalt, tin, and other known metal atoms.

In the invention, a polymer melt is discharged from a reactor to form a discharged polymer melt stream. The polymer melt is made in a melt phase process for the manufacture of the polyester polymer. The melt phase process includes all equipment and processes used to make and isolate a solid polymer obtained from reactants used to make the polymer.

The reactor may be any reactor used in the melt phase process for making the polyester polymer provided that a polyester polymer melt is present. The reactors are desirably polycondensation reactors, and they fall under a variety of on or more names, including a prepolymerization reactor, a prefinishing reactor, a first stage reactor, a second stage reactor, or a finishing reactor or their equivalents. Polycondensation is typically continued in one or more finishing vessels and generally, but not necessarily, ramped up to higher temperatures than present in the prepolymerization zone, to a value within a range of from 250° C. to 310° C., more generally from 270 to 300° C., until the It.V. of the melt is increased to a final desired It.V. The final vessel, generally known in the industry as the "high polymerizer," "finisher," or "polycondenser," is also usually operated at a pressure lower than used in the prepolymerization zone to further drive off the diol and/or other byproducts and increase the molecular weight of the polymer melt. The pressure in the finishing zone may be within the range of about 0.2 to 20 mm Hg, or 0.2 to 10 mm Hg, or 0.2 to 2 mm Hg. Although the finishing zone typically involves the same basic chemistry as the prepolymer zone, the fact that the size of the molecules, and thus the viscosity differs, means that the reaction conditions also differ. However, like the prepolymer reactor, each of the finishing vessel(s) is operated under vacuum or inert gas, and each is typically but not necessarily mechanically agitated to facilitate the removal of the diol and/or other byproducts. While reference has been made to a variety of operating conditions at certain discrete It.V. values, differing process conditions may be implemented inside or outside of the stated It.V. values, or the stated operating conditions may be applied at It.V. points in the melt other than as stated. Moreover, one may adjust the process conditions based on reaction time instead of measuring or predicting the It.V. of the melt. The process is also not limited to the use of tank reactors in series or parallel or to the use of different vessels for each zone. For example, the reactors may be one or more pipe reactors. Nor is it necessary to split the polycondensation reaction into a prepolymer zone and a finishing zone because the polycondensation reaction can take place on a continuum of slight variations in operating conditions over time in one polycondensation reactor or in a multitude of reactors in series, either in a batch, semi-batch, or a continuous process.

The polyester melt should have an It.V. of at least 0.2 dL/g, or at least 0.3 dL/g, or at least 0.4 dL/g, or at least 0.5 dL/g, or at least 0.60 dL/g, or at least 0.68 dL/g, and desirably at least 0.70 dL/g, or at least 0.72 dL/g, or at least 0.74 dL/g, or at least 0.76 dL/g, or at least 0.80 dL/g, in the discharged polymer melt stream. Preferably, the polymer melt is discharged from the final reactor used in the melt phase process, typically known as the finisher or final polycondensation reactor. More preferably, the polymer melt is discharged from the bottom or last stage of the final reactor in the melt phase process. As shown in FIG. 1, a polymer melt 101, such as a polyester polymer melt, is fed into a final finishing (or final polycondensation) reactor vessel 102 where polycondensation is continued, and is discharged from the vessel 102 as a discharged polymer melt stream 103 through a gear pump 104 or other suitable motive force. In one embodiment, the polyester polymer in the discharged polyester polymer melt stream has an It.V. of at least 0.60 dL/g, or at least 0.68 dL/g, or at least 0.72 dL/g, or at least 0.74 dL/g, or at least 0.76 dL/g. At the time the polymer melt is discharged from the final reactor 102, it may or may not contain the additive supplied by the slipstream. As shown in FIG. 1, the discharged polymer melt stream 103 will contain the additive supplied by the slipstream through line 112 which feeds the final reactor 102.

In step b), the discharged polymer melt stream is ultimately solidified by any technique. At the time the discharged polymer melt stream is solidified, it will contain the additive provided through the slipstream as described further below. The method for solidifying the polyester polymer from the melt phase process is not limited. Any conventional hot pelletization or dicing method and apparatus can be used, including but not limited to dicing, strand pelletizing and strand (forced conveyance) pelletizing, pastillators, water ring pelletizers, hot face pelletizers, underwater pelletizers (cutters) and centrifuged pelletizers. For example, molten polyester polymer from the melt phase may be directed through a die, or merely cut, or both directed through a die followed by cutting the molten polymer. A gear pump may be used as the motive force to drive the molten polyester polymer through the die. Instead of using a gear pump, the molten polyester polymer may be fed into a single or twin screw extruder and extruded through a die, optionally at a temperature of 190° C. or more at the extruder nozzle. Once through the die, the polyester polymer can be drawn into strands, contacted with a cool fluid, and chopped into pellets, or the polymer can be pelletized at the die head, optionally underwater. The polyester polymer melt is optionally filtered through filters 104 to remove particulates over a designated size before being cut.

The melt phase product is processed to a desired form, such as amorphous particles. The shape of the polyester polymer particles is not limited, and can include regular or irregular shaped discrete particles without limitation on their dimensions, including stars, spheres, spheroids, globoids, cylindrically shaped pellets, conventional pellets, pastilles, and any other shape.

In step c), a portion of the discharged polymer melt stream 103 is fed or diverted to a slipstream 105 to form a slipstream polymer melt prior to solidification. The amount diverted can be regulated by a valve or other suitable means known in to regulate flows. A slipstream ram valve 106 is depicted to allow removal of a portion of the discharged polymer melt stream into the slipstream 105. If desired, one may employ an optional pump to provide motive force driving the slipstream molten polymer back to the reactor or any other reactor upstream of the reactor from which the discharged polymer was taken.

In step d), an additive is fed into said slipstream polymer melt to form an additive containing polymer melt stream. For example, as depicted in FIG. 1, an additive in an additive stream 107 is fed from a tote through a pump (not shown) or from any other source through pumps or other devices for providing motive force for feeding the additive into the slipstream through an additive injection point such as a ram valve 108 into the slipstream line 105. The amount of additive used may be regulated by a regulator. An additive ram valve 108 is depicted as one means to deliver a flow of an additive stream into the slipstream. The additive stream added to the slipstream forms an additive containing polymer melt stream 109.

The additive injection nozzle (not depicted) supplying the additive from line 107 and feeding line 105 should be of a design to prevent plugging. For example, the injection nozzle may have a nozzle portion which protrudes to the center line of the slipstream pipe. The opening in the tip of the nozzle is restricted to a diameter sufficiently small to prevent the slipstream molten polymer from entering the nozzle. The small restriction creates a pressure drop across the tip as the additive composition is injected into the slipstream molten polymer. When the ram valve is closed, a piston extension is inserted into the nozzle and extends through the nozzle tip preventing polymer from entering the nozzle.

The additive feed rate into the slipstream will depend on the desired concentration of the additive in the finished polymer melt stream 120 ready for solification.

The additive can be a liquid additive or a solid additive. An example of a liquid additive is a phosphorus based compound used to stabilize or deactivate polycondensation catalysts present in the reactor 102. An example of a solid additive may include metal powders or dispersions used as reheat additives or slip agents, or barrier or scavenging material which optionally can be melted before feeding. Preferably, any solid additive is first compounded into a similar or same type of polymer as made in the reactor to form a concentrate, and this concentrate is fed in molten form to the slipstream.

For example, a solid concentrate comprising an additive and a polyester polymer having an It.V. of at least 0.60 dL/g may be melted and pumped (metered or extruded or fed through a gear pump into the slipstream line 105 as a predefined rate corresponding to a predetermined concentration of additive in the discharged polymer melt stream 103 or the finished polymer composition 120. The feed rate will be determined by the concentration of the additives in the concentrate, the desired concentration of the additive in the discharged polymer melt stream 103 or the finished polymer composition 120, and the flow rate of the slipstream. The means by which the solid additive composition can be made and fed can very. For example, as mentioned above, pre-manufactured solid concentrate pellets containing a concentrated amount of additive may be fed to a single screw extruder, melted, and metered into the slipstream line 105. Alternatively, one may both compound and feed the additive into the slipstream. This may be accomplished by compounding the neat additive into solid polyester polymer pellets in a single or twin screw extruder, and feeding the resulting molten additive composition into the slipstream.

The composition of the slipstream in line 105 will contain additives supplied by through line 107 since the slipstream is withdrawn continuously and the discharged polymer melt stream contains the additive supplied through line 104. However, since only a portion of the discharged polymer melt stream is fed to a slipstream, and the discharged polymer melt stream is discharged continuously, additive is supplied through line 107 into the slipstream polymer melt to form an additive containing slipstream. The additive containing slipstream is enriched in the concentration of additive supplied through line 107 relative to the concentration of additive in the slipstream polymer melt before addition of the additive. The concentration of additive in the slipstream polymer melt is less than the concentration of the additive in the additive containing slipstream. In one embodiment, the concentration of additive in the additive containing slipstream is increased by at least 5%, or at least 10%, or at least 20%, or at least 25%, or at least 50%, or at least 75%, over the concentration of the additive in the slipstream polymer melt.

The additive may be fed into the slipstream polymer melt continuously or intermittently as needed to elevate the concentration of the additive in the finished polymer composition. Preferably, the additive is fed continuously.

The slipstream flow rates may be regulated by a pump in line with the slipstream 105 (not shown) or by the pressure created in the discharged polymer melt stream line 103 by the gear pump 104, or by a flow control valve, or by sizing the piping lines to the desired pressure drop.

Depicted in FIG. 1 is a pressure driven slipstream line 105. The slipstream flow rate through line 105 and into 109 and 112 may be determined by the concentration of additives used to feed the slipstream and the desired concentration of additives in the discharged polymer melt stream. In one embodiment, the slip stream flow rate can vary from 2% to 50%, or 5% to 25% of the discharged polymer melt stream production rate depending on what type of additives are being added and the desired concentration of additive in the finished polymer composition 120 or in the discharged melt stream 103. In a pressure driven slipstream flow rate, the flowrate of the slipstream 105 will self balance by increasing the flow rate of the slipstream to accommodate pressure drops in the loop.

Alternatively, a pump can be installed in the slipstream line 105 to set a fixed or constant flow rate, optionally a predetermined flow rate. The control valve 106 need not be supplied if a gear pump is used in the slipstream take off line. The slipstream gear pump can act as both a pressure let-down device while controlling the flowrate.

After the additive is added into the slipstream, one may in some cases find it desirable to optionally employ a mixing device to obtain good mixing between the additive and the slipstream polymer melt, especially between dramatically different viscosity fluids or between solids and liquids. An in-line mixer may be employed in a pipe, or baffles or weirs may be employed, or as depicted in FIG. 1, a static mixer 110 may be employed. The type of mixing device used in not limited.

In the event that the type of additive used is corrosive, the metallurgy of the piping, mixers, valves, and pumps may be a Hastelloy or titanium or other suitable corrosion resistant material.

In yet another embodiment, there is provided a process in which a slipstream molten polymer stream to which a first additive has been added is fed to a twin screw extruder, and a second additive composition is fed to the same twin screw extruder, the compositions are mixed and discharged from the twin screw extruder as a slipstream molten polymer stream containing two or more additives. Optionally, a gear pump may be provided at the discharge of the extruder to provide the necessary pressure for returning the slip stream polymer composition to the reactor.

Once the additives have been added into the slipstream line 105 to form an additive containing slipstream, the slipstream is fed in a step e) to a location upstream from the feed location forming the slipstream. This would include feeding the additive containing slipstream to line 103 prior to the slipstream valve 106, to the entry of a gear pump 104, to the reactor 102 from which the molten polymer was discharged, or to a pipe or reactor upstream of the reactor 102 anywhere in the melt phase process, including to or in the prepolymerization zone or between the prepolymerization zone and the final polycondensation or finishing zone As depicted in FIG. 1, the additive containing slipstream is fed back to the reactor 102 through a ram valve 112. Optionally, the additive containing slipstream may have been well mixed through a mixer such as a static mixer 110.

Desirably, the additive containing slipstream is fed to the bottom of the reactor 102. In this way, the additive, and in particular a catalyst deactivator and/or stabilizer, is added late in the process after substantial completion of polycondensation, which is when one or more of the following conditions are satisfied or thereafter and before solidification of the polyester melt:

a) the polyester melt reaches an It.V. of at least 0.50 dL/g, or at least 0.60, or at least 0.68 dL/g, or at least 0.70 dL/g, or at least 0.72 dL/g, or at least 0.74 dL/g, or at least 0.76 dL/g, or at least 0.80 dL/g, or b) vacuum applied to the polyester melt, if any, is released or reduced, or c) if the polyester melt is present in a melt phase polymerization process, adding the additive within a final reactor for making the polyester polymer or between the final reactor and the take off point for forming a slipstream, or d) following at least 85% of the time for polycondensing the polyester melt; or e) the It.V. of the polyester melt is within ±0.10 dL/g, or within 0.05 dL/g of the highest It.V. obtained prior to solidification; or f) at a point within 20 minutes or less prior to solidifying the polyester.

If desired, the additive containing slipstream can be fed to the final polycondensation reactor 102 and distributed in the polymer melt within the reactor 102 through a distributor plate or in any other fashion one desires. The distributor plate (not depicted) may be mounted within the reactor 102 and may have a circular design with an inlet to receive the additive containing slipstream. The additive containing slipstream is split and distributed across the plate through a plurality of channels in the plate and exits at the bottom of the plate through the channel outlets into the polymer melt contained in the final polycondensation reactor 102.

The distributor plate may comprise a first plate having an inner surface and an outer surface, the outer surface having an opening for receiving the second material, the inner surface having a plurality of channels disposed therein, wherein at least one of the channels of the first plate is in communication with the opening, and a second plate connected to the first plate, the second plate having an inner surface and an outer surface, the inner surface of the second plate having a plurality of channels disposed therein, wherein at least one of the plurality of channels of the second plate are aligned with said plurality of channels of the first plate to form enclosed channels in communication with the opening. Desirably, at least one of the plurality of channels of said second plate has outlet holes, wherein the outlets extend from at least one of the channels of the second plate to the outer surface of the second plate.

Beyond the take off point to the slipstream 105, the discharged polyester polymer is fed to a solidification device (not depicted) and optionally fed through filters 104.

The process is a continuous recirculation loop such that in operation in a steady state, the slipstream polymer melt 105 will already contain some amount of additive, with additional amounts of additive injected into the slipstream line to form an enriched additive containing slipstream relative to the concentration of additive in the slipstream prior to the additive addition point. The composition of the slipstream in line 105 will contain additives supplied by through line 107 since the slipstream is withdrawn continuously and the discharged polymer melt stream contains the additive supplied through line 104. However, since only a portion of the discharged polymer melt stream is fed to a slipstream, and the discharged polymer melt stream is discharged continuously, additive is supplied through line 107 into the slipstream polymer melt to form an additive containing slipstream. The additive containing slipstream is enriched in the concentration of additive supplied through line 107 relative to the concentration of additive in the slipstream polymer melt before addition of the additive. The concentration of additive in the slipstream polymer melt is less than the concentration of the additive in the additive containing slipstream. In one embodiment, the concentration of additive in the additive containing slipstream is increased by at least 5%, or at least 10%, or at least 20%, or at least 25%, or at least 50%, or at least 75%, over the concentration of the additive in the slipstream polymer melt.

The additive may be fed into the slipstream polymer melt continuously or intermittently as needed to elevate the concentration of the additive in the finished polymer composition. Preferably, the additive is fed continuously.

Figure 2:
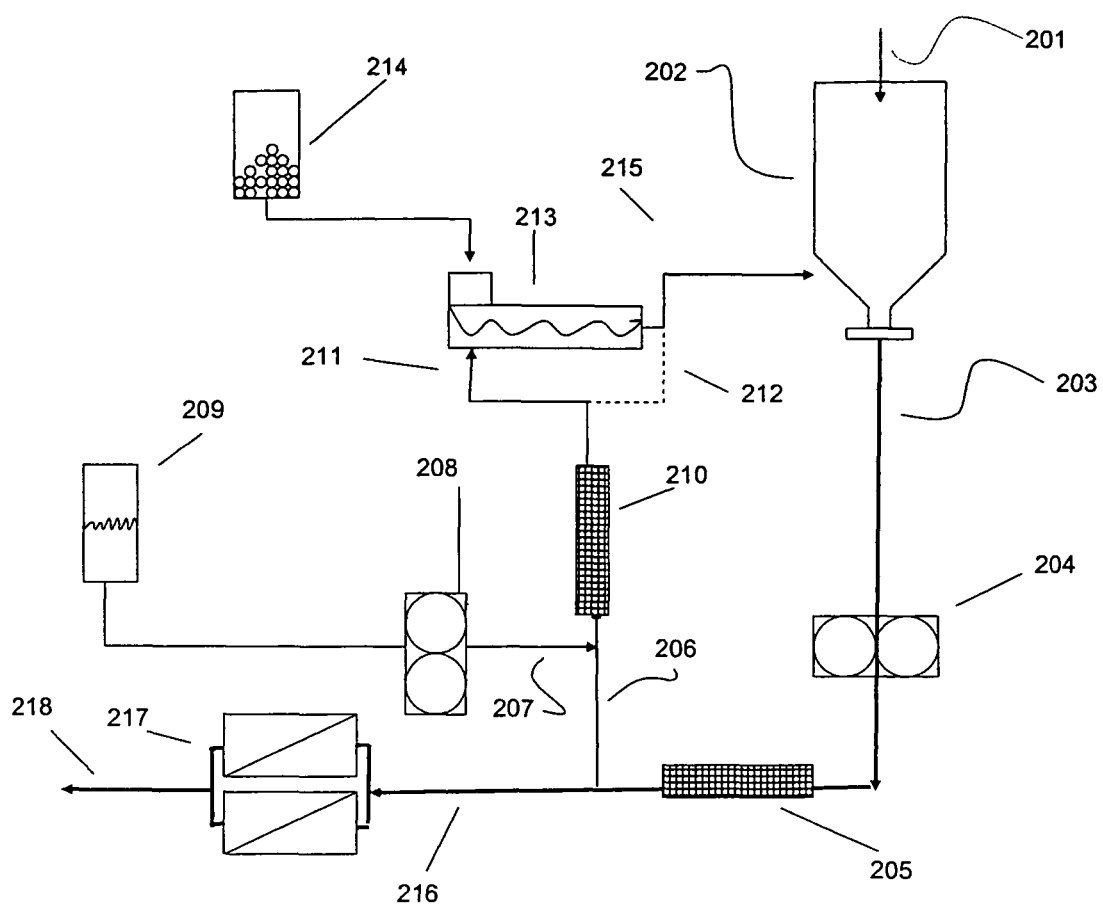
FIG. 2 is an alternative embodiment for illustrating a slipstream method for adding additives and polymers or second additives into a polymer melt stream

In another embodiment, both a liquid or solid additive composition can be fed into the slipstream at a first addition point, and downstream of the first addition point, a second additive composition can be fed into the line in a similar fashion before or after a mixing device. This embodiment is depicted in FIG. 2.

A polyester melt 201 is fed to a reactor 202 within the melt phase process, preferably to a final polycondensation reactor, and is discharged from the bottom of the reactor 202 to form a discharged polymer melt stream 203. The gear pump 204 or any other suitable positive displacement device pumps the discharged polymer melt stream through an optional in-line static mixer element 205 to well mix the polymer melt, after which it proceeds through line 216 as a finished polymer composition through one or more optional filters 217 and sent through line 218 to a cutting device (not depicted) or any other suitable solidification device or directly to an injection molding machine or other extrusion device to make articles, also known as a melt to mold process or direct performing process.

A portion of the discharged polymer melt stream is withdrawn and fed to a slipstream to form a slipstream polymer melt in line 206 which has a concentration of additive lower than the concentration of additive in the additive containing slipstream. A liquid additive is fed from a first additive supply tank 209 through line 207 into a gear pump 208 or other positive displacement device providing a motive force and is fed to the slipstream polymer melt in line 206 to form an additive containing slipstream in line 211 and/or 212. The additive containing slipstream may be fed through an optional in-line static mixer 210 to mix the additive with the polymer melt.

The additive containing slipstream may be fed through line 211 to an in-line extrusion device 213 (such as a single or twin screw extruder). The extrusion device 213 is supplied with a second additive from second additive supply tank 214. As illustrated, solid polymer particles from tank 214 are fed to the extrusion device 213 along with the additive containing slipstream 211, melted and compounded to form a first and second additive containing slipstream through line 215 and fed into the reactor 202. The concentration of the second additive in the first and second additive containing slipstream is higher than its concentration in the first additive containing slipstream, desirably at least 10% higher, or at least 20% higher, or at least 40% higher, or at least 50% higher, or at least 75% higher, or at least 90% higher.

The percentage increases in concentrations as used throughout is determined by taking the concentration of additive in the sample stream less the concentration of additive in the reference stream, the difference divided by the concentration in the reference stream, the product multiplied by 100.

Instead of providing an in-line extrusion device, the output of the extrusion device 213 may feed the first additive containing slipstream through line 212. The embodiment provides the flexibility to turn the extrusion device on when a second additive is desired, and off otherwise. In this embodiment, the first additive containing supply stream does not have to be fed through an extrusion device when a second additive is not required. When the second additive is desired, the second additive in the supply tank 214 is fed to the extrusion device 213, melted, and then fed into the first additive containing slipstream to create a first and second additive containing slipstream in line 215 fed into the reactor 202.

By the method of the invention, one may form amorphous polyester polymer particles, optionally at high It.V. without the need for solid state polymerization to further increase their molecular weight, which contain additives added late to minimize additive thermal degradation, to deactivate or stabilize polycondensation catalysts, and which are also well mixed into the final polymer melt. The use of reactive carrier can be dispensed with if desired, thereby allowing for better control of polymer structure and properties and in the case of lower molecular weight carriers reducing the volatiles taken off under reduced pressure conditions seen during polycondensation if added early to the process.

Examples of additives that can be incorporated into the discharged polymer melt stream, whether as a first additive or a second additive, include crystallization aids, impact modifiers, surface lubricants, denesting agents, compounds, antioxidants, ultraviolet light absorbing agents, catalyst metal deactivators, colorants, nucleating agents, acetaldehyde reducing or oxidizeable compounds, reheat rate enhancing aids, sticky bottle additives that reduce the coefficient of friction between blown bottles or sheets or other articles such as talc additive, and fillers, oxygen barrier materials, polyester polymers which are different in molecular weight or modification than the polyester polymer produced in the reactor 202 prior to introducing the additive containing slipstream, and the like. In particular, it is desirable to employ a catalyst stabilizer and/or deactivator as a first additive, and optionally employ a second additive.

Illustrative examples of the second additive include any of those mentioned above. Particular mention may be made of polyester polymers such as those described above but having a molar amount of modifier compound residues which are different than the molar amount of the same modifier compound residues in the polyester polymer found in the first additive containing slipstream, or having a type of modifier compound residue not found in the polyester polymer in the first additive containing slipstream. Other examples of the second additive include polyamide polymers and polycarbonate polymers.

In one embodiment, the additive, whether as a first or second additive, is a catalyst deactivator. By a catalyst deactivator is meant a compound effective to at least partially deactivate or inhibit the activity of the catalyst system in the polymer melt. A compound is effective to at least partially deactivate the catalyst system when by its addition at a given level, and solely for testing the effectiveness of a compound at a given level, either or both a) the rate of polymerization in the solid state under actual operating conditions is reduced relative to the same polymer without the deactivator ("no additive case") and/or b) when added earlier, the rate of melt-phase polycondensation under actual operating conditions to a constant It.V. target is reduced, that is, it takes more time to reach the It.V. target, or the It.V. of the polymer is reduced at constant time relative to the no additive case. Preferably, the catalyst deactivator also reduces the rate of acetaldehyde (AA) generation upon melting particles relative to the no additive case to lower the contribution of AA generation on AA levels in a molded article, such as a preform, relative to a no additive case, and more preferably upon melting particles having an It.V. of at least 0.72 dL/g obtained from a melt phase polymerization.

Suitable catalyst deactivating additives are preferably phosphorus containing compounds. The phosphorus compounds contain one or more phosphorus atoms. Preferred are phosphate triesters, acidic phosphorus compounds or their ester derivatives, and amine salts of acidic phosphorus containing compounds. Acidic phosphorus compounds have at least one oxyacid group, that is, at least one phosphorus atom double-bonded to oxygen and single-bonded to at least one hydroxyl or OH group. The number of acidic groups increases as the number of hydroxyl groups, bound to the phosphorus atom that is double-bonded to oxygen, increases.

Specific examples of phosphorus compounds include phosphoric acid, pyrophosphoric acid, phosphorous acid, polyphosphoric acid, carboxyphosphonic acids, alkylphosphonic acids, phosphonic acid derivatives, and each of their acidic salts and acidic esters and derivatives, including acidic phosphate esters such as phosphate mono- and di-esters and non-acidic phosphate esters (e.g. phosphate tri-esters) such as trimethyl phosphate, triethyl phosphate, tributyl phosphate, tributoxyethyl phosphate, tris(2-ethylhexyl) phosphate, oligomeric phosphate tri-esters, trioctyl phosphate, triphenyl phosphate, tritolyl phosphate, (tris)ethylene glycol phosphate, triethyl phosphonoacetate, dimethyl methyl phosphonate, tetraisopropyl methylenediphosphonate, mono-, di-, and tri-esters of phosphoric acid with ethylene glycol, diethylene glycol, or 2-ethylhexanol, or mixtures of each. Other examples include distearylpentaerythritol diphosphite, mono- and di-hydrogen phosphate compounds, phosphite compounds, certain inorganic phosphorus compounds that are preferably soluble in the polymer melt, poly(ethylene) hydrogen phosphate, and silyl phosphates. Haze in solutions of particles or in molded parts is one indication of the lack of solubility or limited solubility of an additive in the polymer melt. Soluble additives are more likely to deactivate/stabilize the catalyst system.

Other phosphorus compounds which may be added include the amine salts of acidic phosphorus compounds. The amines may be cyclic or acyclic, may be monomeric, oligomeric, or polymeric, and should be selected so as to minimize haze and/or maximize solubility when these are issues. The organic constituents of the amine may in principle be any organic group. Ammonia and related compounds like ammonium hydroxide are suitable.

Suitable organic groups on the amine include linear and branched alkyl, cycloalkyl, aryl, aralkyl, alkaryl, heteroaryl, etc. Each of these types of organic groups may be substituted or unsubstituted, i.e. with hydroxy, carboxy, alkoxy, halo, and like groups. The organic groups may also contain carbonate, keto, ether, and thioether linkages, as well as amide, ester, sulfoxide, sulfone, epoxy, and the like. This list is illustrative and not limiting.

Examples of amines are cyclic amines having a 5 to 7 membered ring, preferably a six membered ring. These rings may constitute a single "monomeric" species, or may be part of a larger oligomer or polymer.

Examples of cyclic amines are hindered amines which have organic groups substituted at ring positions adjacent to the ring nitrogen. The ring nitrogen itself may also be substituted, i.e. by alkyl, aryl, aralkyl, alkaryl, and other groups. The hindered amines may also comprise a portion of an oligomeric moiety or polymeric moiety.

Other types of amines are amino acids. Amino acids with decomposition points at or above polymerization temperatures are especially preferred. The L-enantiomer, the D-enantiomer or any mixture thereof, including racemic mixtures, may be used. The amine group and the carboxylic acid group do not have to be attached to the same carbon. The amino acids may be alpha, beta or gamma. Substituted amino acids may be used. Amino acids with some solubility in water are especially preferred as this allows the synthesis of the salt to be done in water, that is, without VOC's (volatile organic compounds).

Suitable amines contain at least one nitrogen capable of salt formation with a phosphorus-containing acid. In hindered amines containing N-alkylated piperidinyl moieties, for example, salt formation may involve the piperidinyl nitrogen, generating species such as (but not limited to):

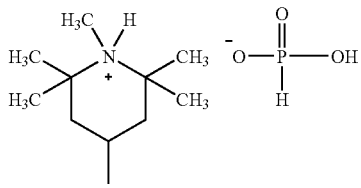
(V)

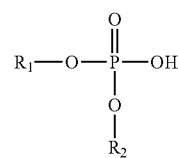
(1)

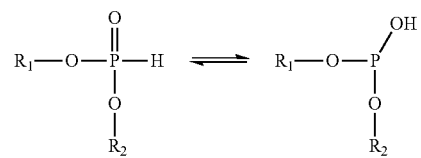
(2)

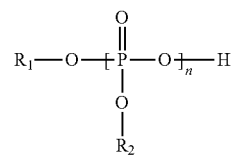
(3)

(4)

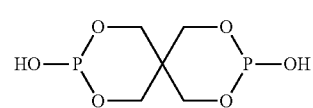
(5)

When there is one nitrogen in the amine compound that can form a salt, one mole of phosphorus-containing acid is used per mole of amine compound. When there are two or more nitrogen atoms in the amine compound that can form salts, two or more moles of acid can be used per mole of amine compound, up to an amount of acid, which creates salts having no remaining neutralizable nitrogen, or slightly in excess of this amount.

The carboxylic acid group of the amino acid opens up the possibility that the amine portion of the salt might be reacted into the polyester chain. Reaction into the polyester chain should result in less volatility and less extractability. Reaction into the polyester chain can also be accomplished if the amine portion of the salt contains a hydroxyl and/or a carboxyl group. If there is only 1 carboxyl or hydroxyl group, the salt could function as an end-capper. If there are a total of 2 or more reactive groups (carboxyl or hydroxyl), the salt may not always be at the end of the chain. Reaction into the polyester chain is also possible for the phosphorus-containing portion of the salt. For example, phosphoric acid can react with hydroxyl compounds to form phosphate esters. The chain end of polyesters is often a hydroxyethyl end group. Phosphoric acid can also react in the middle of a polyester chain.

The precursor to the phosphorus moiety of the phosphorus salt may be any oxyacid of phosphorus including but not limited to hypophosphorous acid, phosphorous acid, phosphoric acid, polyphosophoric acid, polyphosphorous acids, pyrophosphoric acid, phosphinic acids, phosphonic acids, phosphate monoesters, phosphate diesters, phosphonate monoesters, pyrophosphate monoesters, pyrophosphate diesters, pyrophosphate triesters, or salts or compounds which still bear at least one acidic hydrogen, etc. The hydrogen on any OH group bound directly to the P=O group is acidic. Compounds with more than one acidic hydrogen may have one or more acidic hydrogens substituted with organic groups such as alkyl, aryl, aralkyl, alkaryl, etc., by polyether oligomers, polyester oligomers, etc. At least one salt-forming acidic hydrogen must remain, however. Oxyacids of phosphorus with one or more hydrogen bound directly to the P=O group may have one or more of these hydrogens substituted with organic groups such as alkyl, aryl, aralkyl, alkaryl, etc. Examples of these compounds include but are not limited to alkylphosphonic acids, alkylphosphinic acids and dialkylphosphinic acids. As with the amines, the organic groups may be substituted.

In one embodiment, the salts are prepared by the reaction of one or more acidic phosphorus-containing compounds with one or more basic organic compounds containing nitrogen, wherein the phosphorus-containing compounds are preferably selected from compounds having the formulas:

wherein $R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

n is 2 to 500; and

X is selected from hydrogen and hydroxy;

and wherein the basic organic compounds containing nitrogen are desirably selected from compounds having the formulas:

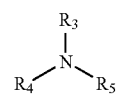
(1)

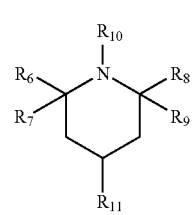
(2)

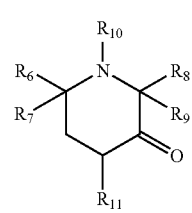
(3)

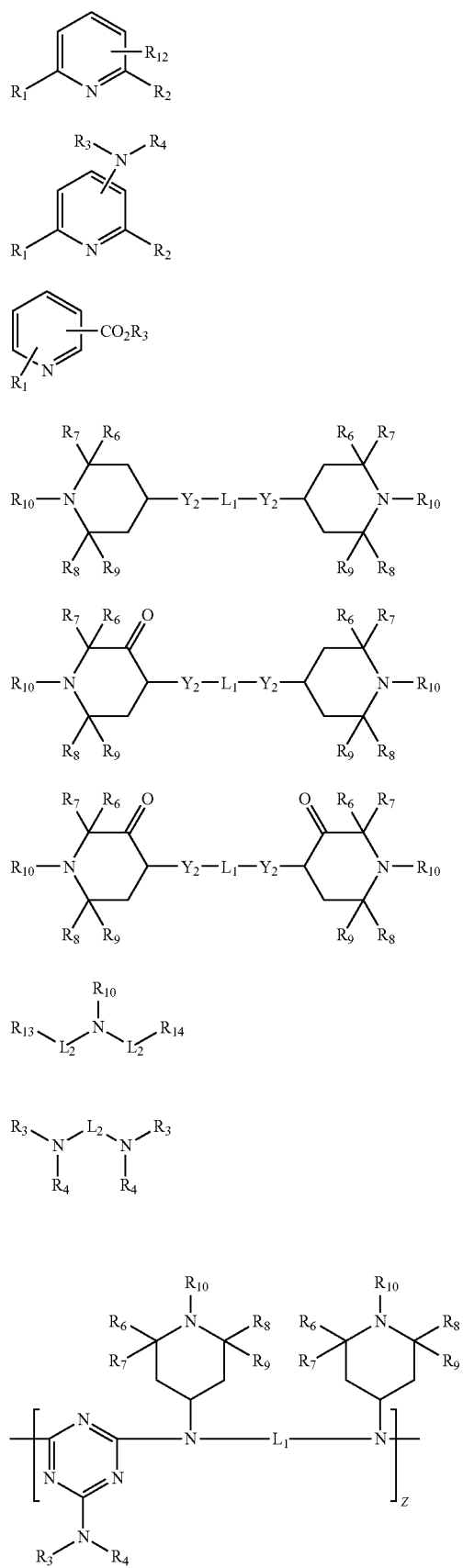
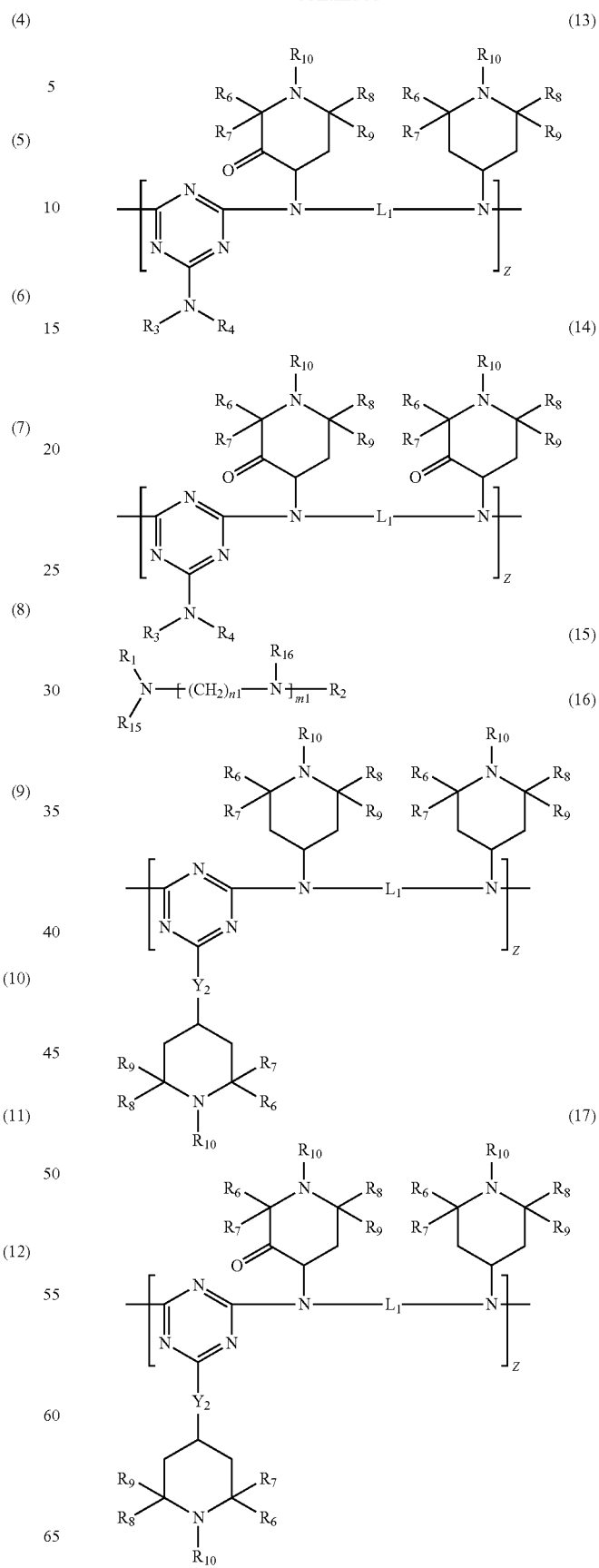

(18)

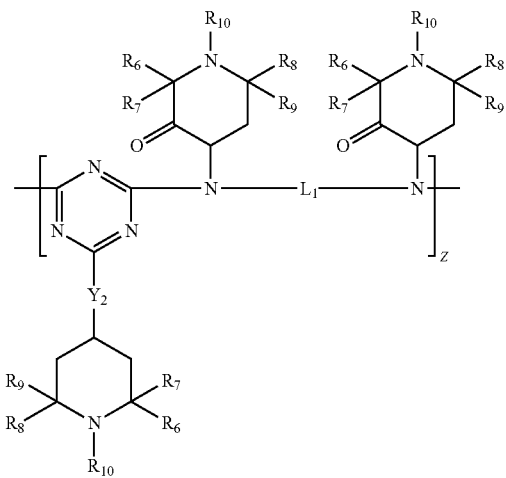

(19)

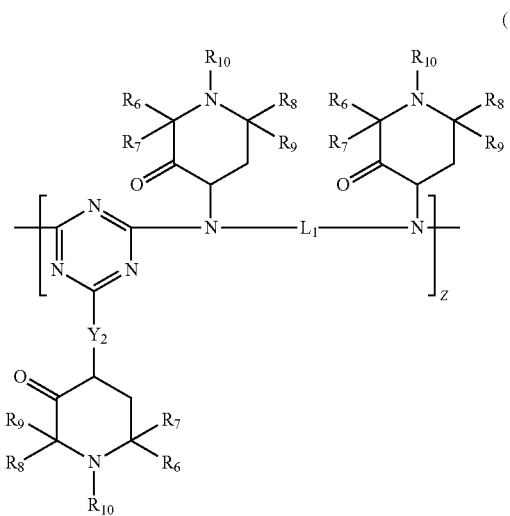

(20)

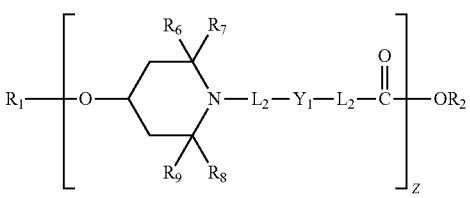

wherein $R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

Each of the following types of organic groups may be substituted or unsubstituted, i.e. with hydroxy, carboxy, alkoxy, halo, and/or like groups, and any combination thereof. The organic groups may also contain carbonate, keto, ether, and thioether linkages, as well as amide, ester, sulfoxide, sulfone, epoxy, and the like. This list is illustrative and not limiting.

$R_3$, $R_4$, and $R_5$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein preferably, at least one of $R_3$, $R_4$, and $R_5$ is a substituent other than hydrogen; however, in the case where $R_3$, $R_4$, and $R_5$ are all hydrogen, ammonium hydroxide is the preferred form; $R_3$ and $R_4$ or $R_4$ and $R_5$ collectively may represent a divalent group forming a ring with the nitrogen atom to which they are attached, e.g., morpholino, piperidino and the like;

$R_6$, $R_7$, $R_8$, and $R_9$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl;

$R_{10}$ is selected from hydrogen, —$OR_6$, $C_1$-$C_{22}$-alkyl, substituted $C_1$-$C_{22}$-alkyl, $C_3$-$C_8$-cycloalkyl, substituted $C_3$-$C_8$-cycloalkyl;

$R_{11}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —$Y_1$—$R_3$ or a succinimido group having the formula

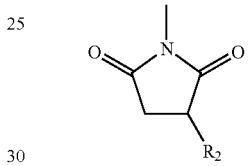

wherein $R_{12}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl and may be located at the 3 4 or 5 positions on the aromatic ring;

the —$N(R_3)(R_4)$ group may be located at the 3, 4 or 5 positions on the pyridine ring of nitrogen compound (5);

the —$CO_2R_3$ and $R_1$ groups may be located at any of the 2, 3, 4, 5, 6 positions of the pyridine ring of nitrogen compound (6);

$L_1$ is a divalent linking group selected from $C_2$-$C_{22}$-alkylene; —$(CH_2CH_2$—$Y_1)_{1-3}$—$CH_2CH_2$—; $C_3$-$C_8$-cycloalkylene; arylene; or —$CO$-$L_2$-$OC$—;

$L_2$ is selected from $C_1$-$C_{22}$-alkylene, arylene, —$(CH_2CH_2$—$Y_1)_{1-3}$—$CH_2CH_2$— and $C_3$-$C_8$-cycloalkylene;

$Y_1$ is selected from —$OC(O)$—, —$NHC(O)$—, —$O$—, —$S$—, —$N(R_1)$—;

$Y_2$ is selected from —$O$— or —$N(R_1)$—;

$R_{13}$ and $R_{14}$ are independently selected from —$O$—$R_2$, and —$N(R_2)_2$;

Z is a positive integer of up to about 20, preferably up to about 6;

m1, is selected from 0 to about 10;

n1 is a positive integer selected from 2 to about 12;

$R_{15}$, and $R_{16}$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, and radical A wherein radical A is selected from the following structures:

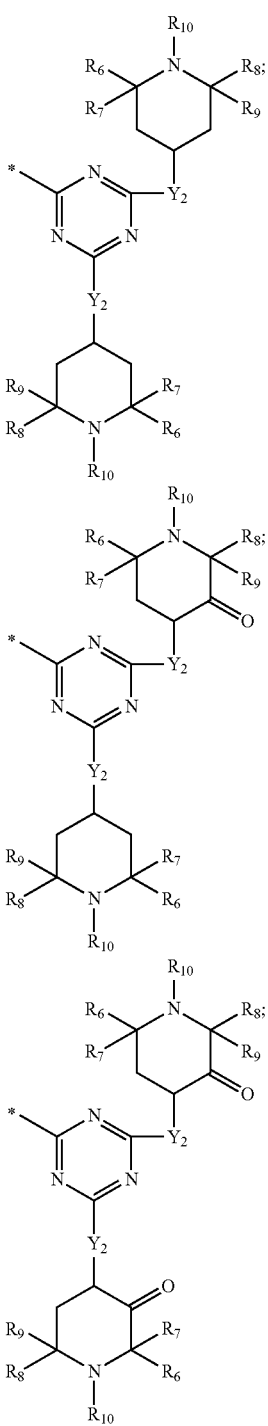

Radical A structures wherein * designates the position of attachment.

At least one of $R_{15}$ and $R_{16}$ is desirably an A radical; and wherein the ratio of the number of phosphorus atoms in the acidic phosphorus-containing compound to the number of basic nitrogen atoms in the basic organic compound is about 0.05 to about 2, preferably from about 0.25 to about 1.1.

The term "$C_1$-$C_{22}$-alkyl" denotes a saturated hydrocarbon radical which contains one to twenty-two carbons and which may be straight or branched-chain. Such $C_1$-$C_{22}$ alkyl groups can be methyl, ethyl, propyl, butyl, pentyl, hexyl, heptyl, octyl, isopropyl, isobutyl, tertbutyl, neopentyl, 2-ethylheptyl, 2-ethylhexyl, and the like. The term "substituted $C_1$-$C_{22}$-alkyl" refers to $C_1$-$C_{22}$-alkyl radicals as described above which may be substituted with one or more substituents selected from hydroxy, carboxy, halogen, cyano, aryl, heteroaryl, $C_3$-$C_8$-cycloalkyl, substituted $C_3$-$C_8$-cycloalkyl, $C_1$-$C_6$-alkoxy, $C_2$-$C_6$ alkanoyloxy and the like.

The term "$C_3$-$C_8$-cycloalkyl" is used to denote a cycloaliphatic hydrocarbon radical containing three to eight carbon atoms. The term "substituted $C_3$-$C_8$-cycloalkyl" is used to describe a $C_3$-$C_8$-cycloalkyl radical as detailed above containing at least one group selected from $C_1$-$C_6$-alkyl, $C_1$-$C_6$-alkoxy, hydroxy, carboxy, halogen, and the like.

The term "aryl" is used to denote an aromatic radical containing 6, 10 or 14 carbon atoms in the conjugated aromatic ring structure and these radicals are optionally substituted with one or more groups selected from $C_1$-$C_6$-alkyl; $C_1$-$C_6$-alkoxy; phenyl, and phenyl substituted with $C_1$-$C_6$-alkyl; $C_1$-$C_6$-alkoxy; $C_3$-$C_8$-cycloalkyl; halogen; hydroxy, carboxy, cyano, trifluoromethyl and the like. Typical aryl groups include phenyl, naphthyl, phenylnaphthyl, anthryl (anthracenyl) and the like. The term "heteroaryl" is used to describe conjugated cyclic radicals containing at least one hetero atom selected from sulfur, oxygen, nitrogen or a combination of these in combination with from two to about ten carbon atoms and these heteroaryl radicals substituted with the groups mentioned above as possible substituents on the aryl radical. Typical heteroaryl radicals include: 2- and 3-furyl, 2- and 3-thienyl, 2- and 3-pyrrolyl, 2-, 3-, and 4-pyridyl, benzothiophen-2-yl; benzothiazol-2-yl, benzoxazol-2-yl, benzimidazol-2-yl, 1,3,4-oxadiazol-2-yl, 1,3,4-thiadiazol-2-yl, 1,2,4-thiadiazol-5-yl, isothiazol-5-yl, imidazol-2-yl, quinolyl and the like.

The terms "$C_1$-$C_6$-alkoxy" and "$C_2$-$C_6$-alkanoyloxy" are used to represent the groups —O—$C_1$-$C_6$-alkyl and —OCO$C_1$-$C_6$-alkyl, respectively, wherein "$C_1$-$C_6$-alkyl" denotes a saturated hydrocarbon that contains 1-6 carbon atoms, which may be straight or branched-chain, and which may be further substituted with one or more groups selected from halogen, methoxy, ethoxy, phenyl, hydroxy, carboxy, acetyloxy and propionyloxy. The term "halogen" is used to represent fluorine, chlorine, bromine, and iodine; however, chlorine and bromine are preferred.

The term "$C_2$-$C_{22}$-alkylene" is used to denote a divalent hydrocarbon radical that contains from two to twenty-two carbons and which may be straight or branched chain and which may be substituted with one or more substituents selected from hydroxy, carboxy, halogen, $C_1$-$C_6$-alkoxy, $C_2$-$C_6$-alkanolyloxy and aryl. The term "$C_3$-$C_8$-cycloalkylene" is used to denote divalent cycloaliphatic radicals containing three to eight carbon atoms and these are optionally substituted with one or more $C_1$-$C_6$-alkyl groups. The term "arylene" is used to denote 1,2-, 1,3-, and 1,4-phenylene radicals and these optionally substituted with $C_1$-$C_6$-alkyl, $C_1$-$C_6$-alkoxy and halogen.

Examples of hindered amines contain alkyl-substituted piperidinyl moieties and/or triazine moieties, more preferably hindered amines where at least one amine group is substituted by both a triazine moiety and an alkyl-substituted piperidine moiety. In the most preferred hindered amines, amino group-containing moieties are linked by an alkylene group, preferably a (—$CH_2$—)$_n$ group where n is from 2 to 12, preferably from 4-10, and most preferably 6 or 8. The most preferred hindered amine is Cyasorb® UV-3529, containing repeat units of the formula:

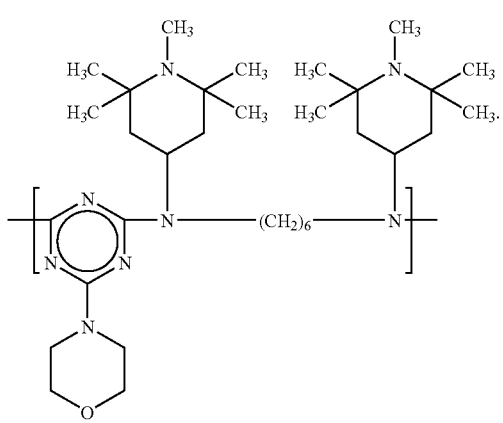

(21)

The salt of the amine component may be prepared by bringing together the acidic phosphorus-containing compound and the basic nitrogen-containing organic compound or ammonium hydroxide in a suitable manner. A suitable manner is any procedure that involves contacting the acidic phosphorus-containing acid with the basic organic compound or ammonium hydroxide. For example, the acidic phosphorus-containing compound and the basic nitrogen-containing organic compound or ammonium hydroxide may be dissolved in appropriate solvents and the solutions mixed followed by precipitation of the reaction product; mixing the phosphorus-containing acid and the basic organic compound or ammonium hydroxide without solvent; and the like.

Since the catalyst system used in the invention can be so easily at least partially deactivated, phosphorus compounds previously found to be less effective with antimony catalyzed systems, such as the full esters of acidic phosphorus compounds, like phosphate triesters, can now be used in the polymer melt and process of the invention. Moreover, phosphorus compounds found to cause an increase in haze with antimony catalyzed systems, such as phosphorous acid, may be used as a deactivator with the catalyst system of the present invention without acting to increase the haze due to reduction of a metal, which, in the case of antimony catalyzed systems, imparts a gray or black color to the polyester.

The ratio of phosphorus atoms to the cumulative total of metal atoms in the catalyst systems ("P:M") is desirably sufficient to accomplish an objective, such as the reduction of AA generation or partial or complete deactivation of the catalyst. In one example, the P:M mole ratio is at least 0.1:1, or at least 0.3:1, or at least 0.5:1, or at least 0.7:1, or at least 1:1, and up to about 5:1, or more preferably up to about 3:1, or up to 2:1, or up to 1.8:1, or up to 1.5:1. Excessively large quantities of acidic phosphorus compounds should be avoided to minimize the loss in polymer It.V. upon addition of the phosphorus compound to the slipstream polyester melt.

Examples of reheat rate enhancing additives include activated carbon, carbon black, antimony metal, tin, copper, silver, gold, palladium, platinum, black iron oxide, iron compounds and alloys, and titanium compounds, metals, and alloys; preferably graphite and titanium, titanium compounds, titanium nitride, boride, or carbide and alloys of titanium. Also included are the near infrared absorbing dyes, including, but not limited to those disclosed in U.S. Pat. No. 6,197,851 which is incorporated herein by reference.

Examples of UV absorbing compounds are those which do or do not covalently bind to the polyester molecule as either a comonomer, a side group, or an end group. Suitable UV absorbing compounds are thermally stable at polyester processing temperatures, absorb in the range of from about 320 nm to about 380 nm, and are difficult to extract or nonextractable from said polymer. The UV absorbing compounds preferably provide less than about 20%, more preferably less than about 10%, transmittance of UV light having a wavelength of 370 nm through a bottle wall 12 mils (305 microns) thick. Suitable chemically reactive UV absorbing compounds include substituted methine compounds of the formula

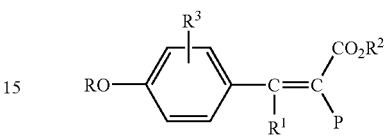

wherein:

R is hydrogen, alkyl, substituted alkyl, aryl, substituted aryl, cycloalkyl, substituted cycloalkyl or alkenyl, or a polyoxyalkylene chain, such as polyoxyethylene or polyoxypropylene polymers, each optionally having some oxypropylene or oxyethylene units in the polymer chain as a block or random copolymer, the polyoxyalkylene chain having a number average molecular weight ranging from 500 to 10,000;

$R^1$ is hydrogen, or a group such as alkyl, aryl, or cycloalkyl, all of which groups may be substituted;

$R^2$ is any radical which does not interfere with condensation with the polyester, such as hydrogen, alkyl, substituted alkyl, allyl, cycloalkyl or aryl;

$R^3$ is hydrogen or 1-3 substitutents selected from alkyl, substituted alkyl, alkoxy, substituted alkoxy and halogen, and P is cyano, or a group such as carbamyl, aryl, alkylsulfonyl, arylsufonyl, heterocyclic, alkanoyl, or aroyl, all of which groups may be substituted.

Preferred methine compounds are those of the above formula wherein: $R^2$ is hydrogen, alkyl, aralkyl, cycloalkyl, cyanoalkyl, alkoxyalkyl, hydroxyalkyl or aryl; R is selected from hydrogen; cycloalkyl; cycloalkyl substituted with one or two of alkyl, alkoxy or halogen; phenyl; phenyl substituted with 1-3 substitutents selected from alkyl, alkoxy, halogen, alkanoylamino, or cyano; straight or branched lower alkenyl; straight or branched alkyl and such alkyl substituted with 1-3 substitutents selected from the following: halogen; cyano; succinimido; glutarimido; phthalimido; phthalimidino; 2-pyrrolidono; cyclohexyl; phenyl; phenyl substituted with alkyl, alkoxy, halogen, cyano, or alkylsufamoyl; vinyl-sulfonyl; acrylamido; sulfamyl; benzoylsulfonicimido; alkylsulfonamido; phenylsulfonamido; alkenylcarbonylamino; groups of the formula

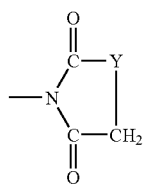

where Y is —NH—, —N-alkyl, —O—, —S—, or —CH$_2$O—; —S—R$_{14}$; SO$_2$CH$_2$CH$_2$SR$_{14}$; wherein R$_{14}$ is alkyl, phenyl, phenyl substituted with halogen, alkyl, alkoxy, alkanoylamino, or cyano, pyridyl, pyrimidinyl, benzoxazolyl, benzimidazolyl, benzothiazolyl; or groups of the formulae

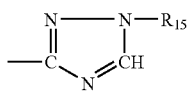

—NHXR$_{16}$, —CONR$_{15}$R$_{15}$, and —SO$_2$NR$_{15}$R$_{15}$;
wherein R$_{15}$ is selected from H, aryl, alkyl, and alkyl substituted with halogen, phenoxy, aryl, —CN, cycloalkyl, alkylsulfonyl, alkylthio, or alkoxy; X is —CO—, —COO—, or —SO$_2$—, and R$_{16}$ is selected from alkyl and alkyl substituted with halogen, phenoxy, aryl, cyano, cycloalkyl, alkylsulfonyl, alkylthio, and alkoxy; and when X is —CO—, R$_{16}$ also can be hydrogen, amino, alkenyl, alkylamino, dialkylamino, arylamino, aryl, or furyl; alkoxy; alkoxy substituted with cyano or alkoxy; phenoxy; or phenoxy substituted with 1-3 substitutents selected from alkyl, alkoxy, or halogen substituents; and P is cyano, carbamyl, N-alkylcarbamyl, N-alkyl-N-arylcarbamyl, N,N-dialkylcarbamyl, N,N-alkylarylcarbamyl, N-arylcarbamyl, N-cyclohexyl-carbamyl, aryl, 2-benzoxazolyl, 2-benzothiazolyl, 2-benzimidazolyl, 1,3,4-thiadiazol-2-yl, 1,3,4-oxadiazol-2-yl, alkylsulfonyl, arylsulfonyl or acyl.

In all of the above definitions the alkyl or divalent aliphatic moieties or portions of the various groups contain from 1-10 carbons, preferably 1-6 carbons, straight or branched chain. Preferred UV absorbing compounds include those where R and R$^1$ are hydrogen, R$^3$ is hydrogen or alkoxy, R$^2$ is alkyl or a substituted alkyl, and P is cyano. In this embodiment, a preferred class of substituted alkyl is hydroxy substituted alkyl. A most preferred polyester composition comprises from about 10 to about 700 ppm of the reaction residue of the compound

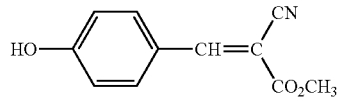

These compounds, their methods of manufacture and incorporation into polyesters are further disclosed in U.S. Pat. No. 4,617,374 the disclosure of which is incorporated herein by reference. The UV absorbing compound(s) may be present in amounts between about 1 to about 5,000 ppm by weight, preferably from about 2 ppm to about 1,500 ppm, and more preferably between about 10 and about 500 ppm by weight. Dimers of the UV absorbing compounds may also be used. Mixtures of two or more UV absorbing compounds may be used. Moreover, because the UV absorbing compounds are reacted with or copolymerized into the backbone of the polymer, the resulting polymers display improved processability including reduced loss of the UV absorbing compound due to plateout and/or volatilization and the like The polyester polymer compositions of the invention are particularly useful to make stretch blow molded bottles, extrusion blow molded bottles, bottle preforms, fibers for carpet or apparel or stuffing, sheets, films, trays, cosmetic bottles and trays, or pharmaceuticals bottles and trays.

What we claim is:

1. A method for adding an additive into a polyester polymer melt comprising:
   (a1) polycondensing, in a reactor, a polyesterified reaction mixture to form a polyester polymer melt,
   (a) discharging the polyester polymer melt from the reactor to form a discharged polyester polymer melt stream, and
   (b) solidifying the discharged polyester polymer melt stream to form polyester particles, and
   (c) prior to solidification, feeding a portion of the discharged polyester polymer melt stream to a slipstream to form a slipstream polyester polymer melt, and
   (d) feeding an additive into said slipstream polyester polymer melt to form an additive containing polyester slipstream melt, and
   (e) feeding the additive containing polyester slipstream melt to the reactor,
   wherein from 50% to 98% of the discharged polyester polymer melt stream is solidified without return to the reactor.

2. The method of claim 1, wherein said polyester polymer melt comprises a polyester polymer having repeating alkylene arylate units.

3. The method of claim 2, wherein said polyester polymer melt comprises a polyester polymer comprising:
   (i) a carboxylic acid component comprising at least 80 mole % of the residues of terephthalic acid, derivates of terephthalic acid, naphthalene-2,6-dicarboxylic acid, derivatives of naphthalene-2,6-dicarboxylic acid, or mixtures thereof, and
   (ii) a hydroxyl component comprising at least 40 mole % of the residues of ethylene glycol or propane diol or cyclohexane dimethanol, based on 100 mole percent of carboxylic acid component residues and 100 mole percent of hydroxyl component residues in the polyester polymer.

4. The method of claim 3, wherein said polyester polymer melt comprises a polyester polymer comprising:
   (i) a carboxylic acid component comprising at least 90 mole % of the residues of terephthalic acid, derivates of terephthalic acid, naphthalene-2,6-dicarboxylic acid, derivatives of naphthalene-2,6-dicarboxylic acid, or mixtures thereof, and
   (ii) a hydroxyl component comprising at least 92 mole % of the residues of ethylene glycol,
   based on 100 mole percent of carboxylic acid component residues and 100 mole percent of hydroxyl component residues in the polyester polymer.

5. The method of claim 3, wherein the discharging of the polyester polymer melt from the reactor occurs continuously.

6. The method of claim 3, wherein the discharged polyester polymer melt stream has an intrinsic viscosity (It.V.) of at least 0.72 dL/g.

7. The method of claim 6, wherein the intrinsic viscosity (It.V.) of the polyester polymer is at least 0.76 dL/g.

8. The method of claim 1, wherein the reactor is a final polycondensation reactor.

9. The method of claim 8, wherein the discharged polyester polymer melt stream contains said additive.

10. The method of claim 1, wherein the discharged polyester polymer melt stream is solidified to form particles by an underwater pelletizer.

11. The method of claim 10, wherein the shape of the particles are spheroids.

12. The method of claim 1, wherein the flow rate of the slipstream polyester polymer melt is regulated by a pump, a valve, or by piping size.

13. The method of claim 1, wherein the flow rate of the slipstream polyester polymer melt is self balancing.

14. The method of claim 1, wherein said additive in an additive stream is fed from an additive supply tank to the slipstream polyester polymer melt through an injection nozzle.

15. The method of claim 14, wherein the additive is added into the slipstream polyester polymer melt through a ram valve.

16. The method of claim 14, wherein the injection nozzle has a tip with an opening sufficiently small to prevent the slipstream polyester polymer melt from entering the tip through the opening.

17. The method of claim 1, wherein the additive is supplied from an additive tank, and said additive in the additive tank is a liquid.

18. The method of claim 1, wherein the additive comprises a phosphorus compound.

19. The method of claim 18, wherein the phosphorus compound is acidic.

20. The method of claim 19, wherein the phosphorus compound comprises phosphoric acid.

21. The method of claim 1, wherein the additive is a solid which is melted prior to feeding the additive into the slipstream polyester polymer melt.

22. The method of claim 1, wherein the additive comprises an ultraviolet light absorber.

23. The method of claim 1, wherein the additive comprises a colorant.

24. The method of claim 1, wherein the concentration of the additive in the additive containing slipstream is greater than the concentration of the additive in the slipstream polyester polymer melt by at least 20%.

25. The method of claim 24, wherein the slipstream polyester polymer melt contains a concentration of said additive.

26. The method of claim 1, wherein the flow rate of the slipstream polyester polymer melt is controlled by a pump.

27. The method of claim 26, wherein the pump acts as a pressure let-down device while controlling the flowrate of the slipstream polyester polymer melt.

28. The method of claim 1, further comprising an in-line mixing device in the additive containing slipstream.

29. The method of claim 1, wherein to the additive containing slipstream is added a second additive through an in-line extrusion device in the additive containing polyester slipstream or by the output of an extrusion device feeding the additive containing slipstream.

30. The method of claim 29, wherein the second additive comprises a molten polyester polymer.

31. The method of claim 1, wherein the polyester polymer melt comprises a polyester melt, and said additive containing slipstream is fed to said reactor when or after:

(a) the polyester melt reaches an intrinsic viscosity (It.V.) of at least 0.72 dL/g, or (b) vacuum applied to the polyester melt, if any, is released or reduced, or (c) following at least 85% of the time for polycondensing the polyester melt; or (d) the intrinsic viscosity (It.V.) of the polyester melt is within +/−0.10 dL/g of the highest It.V. obtained prior to solidifying the discharged polymer melt stream; or (e) at a point within 20 minutes or less prior to solidifying the discharged polyester polymer melt stream.

32. The method of claim 1, wherein the feeding of the additive into the slipstream polyester polymer melt occurs continuously.

33. The method of claim 1, wherein the additive comprises antioxidants, ultraviolet light absorbing agents, catalyst metal deactivators, colorants, acetaldehyde reducing or oxidizeable compounds, reheat rate enhancing aids, sticky bottle additives, or oxygen barrier materials, or combinations thereof.

34. The method of claim 1, wherein the additive comprises phosphorus atoms, and the polymer melt comprises catalyst metal atoms, and a ratio of the phosphorus atoms to the catalyst metal atoms ranges from 0.3:1 to 5:1.

35. The method of claim 34, wherein the ratio of the phosphorus atoms to the catalyst metal atoms ranges from 0.7:1 to 2:1.

36. The method of claim 1, wherein the additive is a solid fed to the slipstream polyester polymer melt through an extruder as an additive melt.

37. The method of claim 1, wherein the additive containing slipstream is fed to the reactor above a liquid level in the reactor.

38. The method of claim 1, wherein the additive is fed into the slipstream polyester polymer melt in solid form.

39. The method of claim 1, wherein the additive is at least one selected from the group consisting of a phosphate triester, an acidic phosphorous compound, an ester of an acidic phosphorous compound, an amine salt of an acidic phosphorous-containing compound and a phosphorous compound having at least one oxyacid group.

40. The method of claim 1, wherein the slipstream polyester polymer melt remains molten during the feeding (d) and the feeding (e).

\* \* \* \* \*